(12) United States Patent
McCann et al.

(10) Patent No.: US 10,791,048 B2
(45) Date of Patent: Sep. 29, 2020

(54) SYSTEM AND METHOD FOR MAKING AND DISSEMINATING LOCAL POLICY DECISIONS IN A SOFTWARE PROGRAMMABLE RADIO NETWORK

(71) Applicant: Futurewei Technologies, Inc., Plano, TX (US)

(72) Inventors: Peter J. McCann, Bridgewater, NJ (US); Jiangnan Jason Chen, Hawthorn Woods, IL (US)

(73) Assignee: Futurewei Technologies, Inc., Plano, TX (US)

( * ) Notice: Subject to any disclaimer, the term of this patent is extended or adjusted under 35 U.S.C. 154(b) by 226 days.

(21) Appl. No.: 14/826,999

(22) Filed: Aug. 14, 2015

(65) Prior Publication Data

US 2016/0337937 A1 Nov. 17, 2016

Related U.S. Application Data

(60) Provisional application No. 62/160,894, filed on May 13, 2015.

(51) Int. Cl.
*H04L 12/715* (2013.01)
*H04W 40/24* (2009.01)
*H04L 12/717* (2013.01)
*H04W 40/00* (2009.01)

(52) U.S. Cl.
CPC .............. *H04L 45/64* (2013.01); *H04L 45/42* (2013.01); *H04W 40/00* (2013.01)

(58) Field of Classification Search
CPC ............................ H04L 45/64; H04W 40/00
See application file for complete search history.

(56) References Cited

U.S. PATENT DOCUMENTS

| 9,038,151 | B1 | 5/2015 | Chua et al. |
| 9,578,593 | B2 | 2/2017 | Mccann et al. |
| 2013/0223226 | A1 | 8/2013 | Narayanan et al. |
| 2014/0241247 | A1* | 8/2014 | Kempf ............... H04L 12/4633 370/328 |

(Continued)

FOREIGN PATENT DOCUMENTS

| CN | 103428771 A | 12/2013 |
| CN | 103716881 A | 4/2014 |

(Continued)

OTHER PUBLICATIONS

Open Networking Foundation, Wireless & Mobile Working Group, "Architecture/Protocol Document," Wireless & Mobile Working Group, Aug. 2014, pp. 1-25.

(Continued)

*Primary Examiner* — Ruihua Zhang
(74) *Attorney, Agent, or Firm* — Slater Matsil, LLP

(57) ABSTRACT

An embodiment wireless communication system includes a base station and a software defined network (SDN)-enabled switch/router configured to communicate data packets with the base station. The wireless communication system also includes a computing platform running at least one virtual device and that is configured to communicate with the SDN-enabled switch/router and to provide software to configure operation of the SDN-enabled switch/router.

27 Claims, 20 Drawing Sheets

(56) References Cited

U.S. PATENT DOCUMENTS

| | | | | |
|---|---|---|---|---|
| 2014/0254373 | A1* | 9/2014 | Varma | H04W 40/36 370/235 |
| 2014/0362790 | A1 | 12/2014 | McCann | |
| 2015/0055623 | A1* | 2/2015 | Li | H04W 40/04 370/331 |
| 2015/0071171 | A1* | 3/2015 | Akiyoshi | H04L 49/70 370/328 |
| 2015/0119050 | A1 | 4/2015 | Liao et al. | |
| 2015/0124782 | A1 | 5/2015 | Bachu et al. | |
| 2015/0215918 | A1 | 7/2015 | Wu et al. | |
| 2015/0250009 | A1* | 9/2015 | Kahn | H04W 76/026 370/329 |
| 2015/0280927 | A1 | 10/2015 | Liang et al. | |
| 2016/0029251 | A1* | 1/2016 | Kahn | H04W 36/0005 370/331 |
| 2016/0112903 | A1 | 4/2016 | Kaushik et al. | |
| 2016/0149779 | A1* | 5/2016 | Sampath | H04L 43/0817 370/250 |
| 2016/0197831 | A1* | 7/2016 | De Foy | H04L 45/7453 370/392 |
| 2016/0344640 | A1* | 11/2016 | Soderlund | H04L 47/2483 |

FOREIGN PATENT DOCUMENTS

| | | |
|---|---|---|
| CN | 103731901 A | 4/2014 |
| CN | 104168209 A | 11/2014 |
| CN | 104301230 A | 1/2015 |
| CN | 104582004 A | 4/2015 |
| EP | 2897433 A1 | 7/2015 |
| EP | 2908464 A1 | 8/2015 |
| WO | 2013184941 A1 | 12/2013 |
| WO | 2014056317 A1 | 4/2014 |
| WO | 2014056445 A1 | 4/2014 |

OTHER PUBLICATIONS

3rd Generation Partnership Project; Technical Specification Group Core Network and Terminals; Non-Access-Stratum (NAS) protocol for Evolved Packet System (EPS); Stage 3 (Release 13); 3GPP TS 24.301 V13.2.0, Jun. 2015, pp. 1-386.

3rd Generation Partnership Project; Technical Specification Group Core Network and Terminals; General Packet Radio Service (GPRS); GPRS Tunnelling Protocol (GTP) across the Gn and Gp interface (Release 13), 3GPP TS 29.060 V13.0.0, Mar. 2015, pp. 1-185.

3rd Generation Partnership Project; Technical Specification Group Radio Access Network; Evolved Universal Terrestrial Radio Access Network (E-UTRAN); S1 Application Protocol (S1AP) (Release 10), 3GPP TS 36.413 V10.3.0, Sep. 2011, pp. 1-254.

Open Networking Foundation, "SDN Architecture," ONF TR-502, Issue 1, Jun. 2014, pp. 1-68.

Venmani Daniel Philip et al.,"Preliminary Analysis of 4G-LTE Mobile Network Sharing for Improving Resiliency and Operator Differentiation",ICeND 2011, CCIS 171, pp. 73-93, 2011,total 23 pages.

* cited by examiner

SYSTEM AND METHOD FOR MAKING AND DISSEMINATING LOCAL POLICY DECISIONS IN A SOFTWARE PROGRAMMABLE RADIO NETWORK

This application claims the benefit of U.S. Provisional Application No. 62/160,894, filed on May 13, 2015, entitled "Systems and Methods for a Software Programmable Radio Network with Legacy Components, and for Making and Disseminating Local Policy Decisions in a Software Programmable Radio Network," which application is hereby incorporated herein by reference.

TECHNICAL FIELD

The present inventions relate generally to systems and methods for software programmable radio networks, and, in particular embodiments, to systems and methods for a software programmable radio network with legacy components.

BACKGROUND

Existing approaches to wireless networking, such as the example shown in network 100 of FIG. 1, use specialized hardware for user plane gateways and control plane signaling implementation. User traffic typically is routed on a long round-trip to the home network as shown in route 102, which makes it difficult to access local services in the visited network. In this example, because the control plane is handled by servers such as mobile management entity 114 and application server 118, along with serving gateway (SGW) 112 and packet data network (PDN) gateway (PGW) 116, data traffic is routed from base station 106 through routers 108 and 110 to SGW 112 to PGW 116 through PGW 120 and high bandwidth WAN to a Wireless Access Gateway (WAG) 121 and then through router 122 and base station 111 to its destination: user equipment 105. A more direct route would be to route the traffic from router 108 directly through router 122. This would apply to traffic through base stations 107 and 109 as well. However, this is not feasible with prior techniques because the routing decision occurs at a central location in a specialized wireless gateway. This increases capital expenditures due to amortization of development costs over fewer units because software and hardware designs are applicable only to large carrier-hosted wireless packet networks. This also increases the operating expenses of the operator due to the need to maintain high bandwidth wide-area network links to remote networks. It also makes it difficult to support applications that use knowledge of the local network such as the venue or enterprise in which the wireless base stations are deployed. Only operator applications are supported, and they must be processed through a policy and charging rules function (PCRF) to modify policies for the user plane. Further, enforcement happens at a remote PGW.

SUMMARY

A described embodiment includes a method for managing operational components on wireless base station including providing a base station. The base station includes a software defined network (SDN) configured to support at least one virtual machine. A computing platform is provided that is in communication with the base station. The computing platform includes at least one virtual machine management unit. The virtual machine management unit configures the at least one virtual machine on the base station to perform at least one function of a base station.

Another described embodiment includes a wireless communication system having a base station that includes a software defined network (SDN) having at least one virtual machine. A computing platform is configured to provide a plurality of virtual machines. At least one of the virtual machines includes a virtual machine management unit. The computing platform is in communication with the base station.

Another described embodiment includes a method for managing operational components on wireless base station. A base station including a software defined network (SDN) configured to support a plurality of virtual machines is provided. A computing platform in communication with the base station including at least one virtual machine management unit is also provided. The virtual machine management unit configures the plurality of virtual machines on the base station to provide functions of an RF transport, a physical layer transport, medium access control (MAC), a radio link control (RLC), a packet data convergence protocol (PDCP) controller and a router.

An embodiment wireless communication system includes a base station having a base station and a software defined network (SDN)-enabled switch/router configured to communicate data packets with the base station. The wireless communication system also includes a computing platform that runs at least one virtual device is configured to communicate with the SDN-enabled switch/router and to provide software to configure operation of the SDN-enabled switch/router.

An embodiment wireless communication system includes an SDN-enabled switch/router proximal to a base station. The SDN enabled switch/router is configured to communicate data packets with the base station and configured to communicate with a computing platform running at least one virtual device. The computing platform is configured to provide software to configure operation of the SDN-enabled switch/router.

An embodiment wireless communication system includes a computing platform running at least one virtual device and configured to communicate with an SDN-enabled switch/router to provide software to configure the operation of the SDN-enabled switch/router. The SDN switch/router is also configured to send and receive data packets with a base station.

An embodiment method for wireless communication includes communicating, by an SDN-enabled switch/router, data packets with a base station. The method also includes communicating with the SDN-enabled switch/router by a computing platform running at least one virtual device, to provide software to configure operation of the SDN-enabled switch/router.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The structure, manufacture and use of the preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Software defined networking (SDN) is an emerging trend enabling more rapid deployment of services. SDN separates network design into a user plane and a control plane, and uses a protocol such as OpenFlow (see SDN Architecture, Issue 1 https://www.opennetworking.org/images/stories/dowloads/sdn-resources/technical-reports/TR_TR_SDN_ARCH_1.0_06062014.pdf, which is hereby incorporated by reference into this specification in its entirety) to allow the control plane to manipulate the user plane.

Initial embodiments described below provide systems and methods for a software programmable radio network with legacy components. An embodiment reuses the software of the existing legacy devices, placing this software into a virtualized environment, and creating new interfaces between these legacy implementations and modern software defined networking components such as controllers and switches. An embodiment allows the use of commodity hardware for the control and user planes, and supports local services and local policy decisions easily. Embodiments may be implemented in wireless access networks, enterprises, public venues, and the like.

Figure 2:
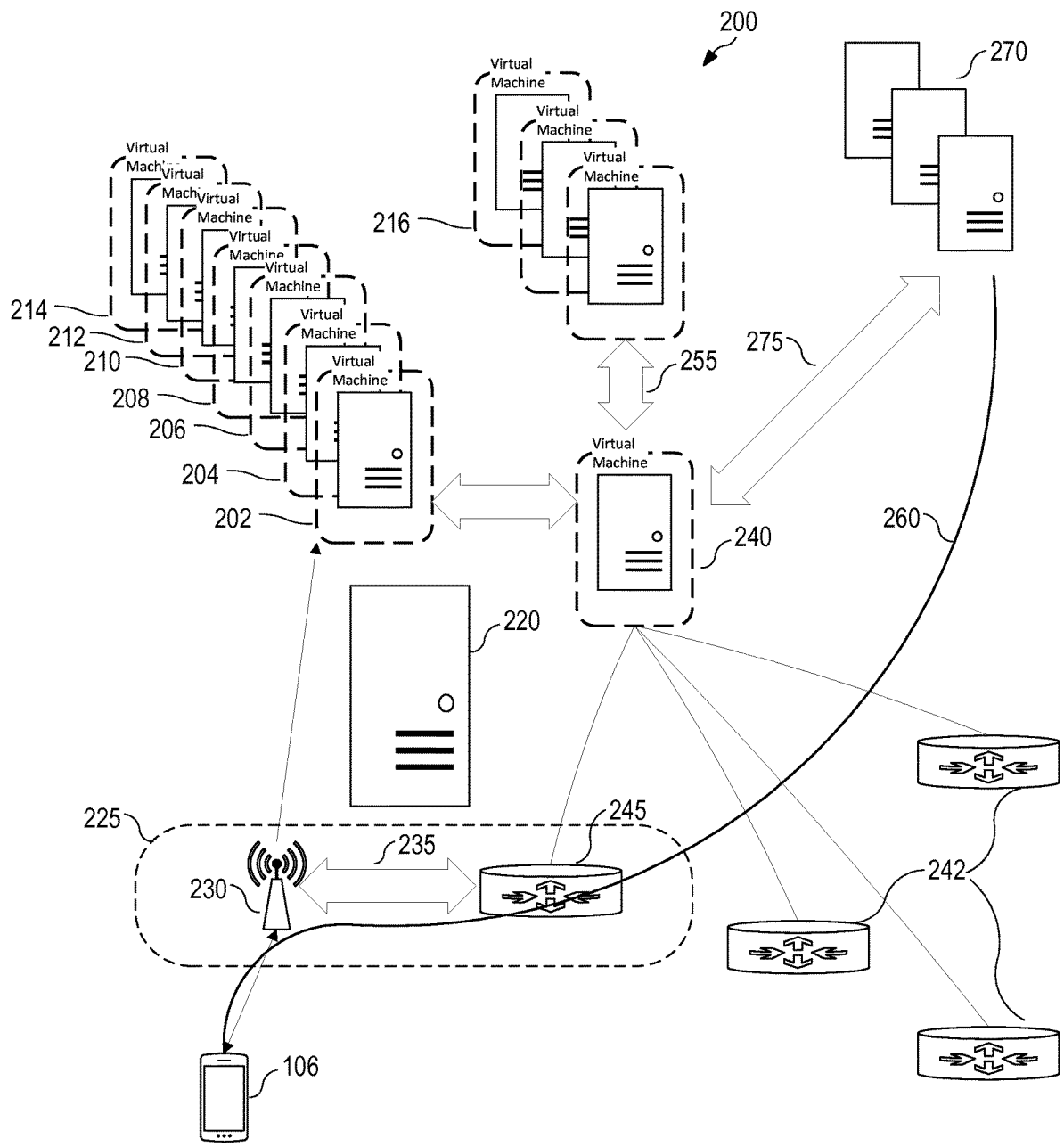
FIG. 2 illustrates an embodiment software programmable radio network with legacy components.

FIG. 2 illustrates an embodiment software programmable radio network (SPRN) with legacy components 200. An embodiment reuses existing code for the mobility management entity (MME) 202, SGW 204, PGW 206, home subscriber service (HSS) 208, access controller (AC) 210, gateway general packet radio service (GPRS) support node (GGSN) 212, serving GPRS support node (SGSN) 214, as well as any other desired function, in a virtualized environment (e.g., implementing an RCx interface to an SDN controller 240). That is, each of the services of 202, 204, 206, 208, 210, 212 and 214 are software running within virtual machines on a standard server or pool of servers 220. Existing base stations, such as base station 230, can be used, thus avoiding the cost of refitting the base stations and allowing upgrading to this embodiment with minimal disruption to existing service. Base station 230 may be a Long Term Evolution (LTE) base station, a Wi-Fi base station, a Universal Mobile Telecommunications System (UMTS) base station or a base stationed designed for any other existing or future transmission technology in the user plane. For support services required by legacy standards, base station 230 communicates directly to the appropriate virtual machine.

Also running on the pool of servers 230 is an SDN controller 240. SDN techniques are used in this embodiment for packet forwarding and mobility management (e.g., enabling almost direct peer-to-peer (P2P) routing with minimal tunnel overhead). Each SDN enabled base station 225 includes a legacy base station 230 and an SDN enabled switch/router 245. To enable SDN routing of data packets, a tunnel or port 235 must be established between the legacy base station 230 and the SDN enabled switch/router 245. In the described embodiment, assuming that legacy base station 230 is an LTE base station, a tunneling path 235 is established using GPRS tunneling protocol (GTP). If instead the base station 230 is a WiFi base stations, a tunneling path 235 is established using generic routing encapsulation (GRE) tunneling. SDN controller 240 pushes nearly all pertinent routing functions to the SDN enabled switch/router 245. This allows routing directly from the base station as opposed to the network of FIG. 1, where routing is performed in a remote central location. In addition, SDN controller 240 controls SDN enabled switches/routers 242.

An embodiment implements a Northbound application programming interface (API) 255 to expose mobility-related features to applications 216 (e.g., device type, device identifier, authentication status, current location). In addition, the use of SDN controller 240 and SDN enabled switch/router allows for user plane level communication links 260 with enterprise/venue/operator application servers 270. Links 260 are established by communication between the enterprise/venue/operator application servers 270 and SDN controller 240 via link 275. The SDN controller can then push routing to SDN enabled switch/router 245, which allows user plane communications with the enterprise/venue/operator application servers 270 or with any other routing policy pushed to the SDN enabled switch/router.

Figure 3A:
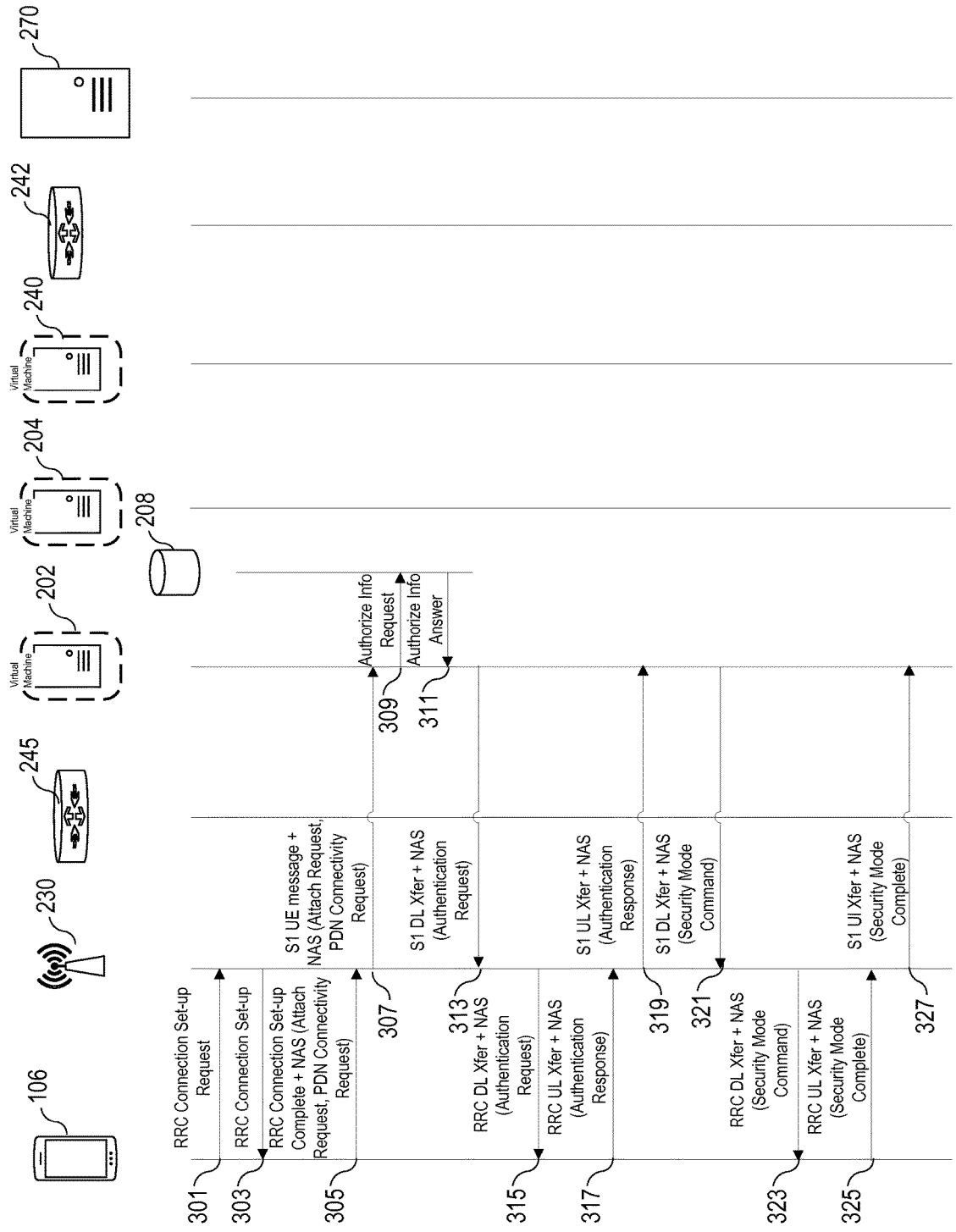
FIGS. 3A, 3B and 3C illustrate network attachment with the embodiment of FIG. 2.
Figure 3B:
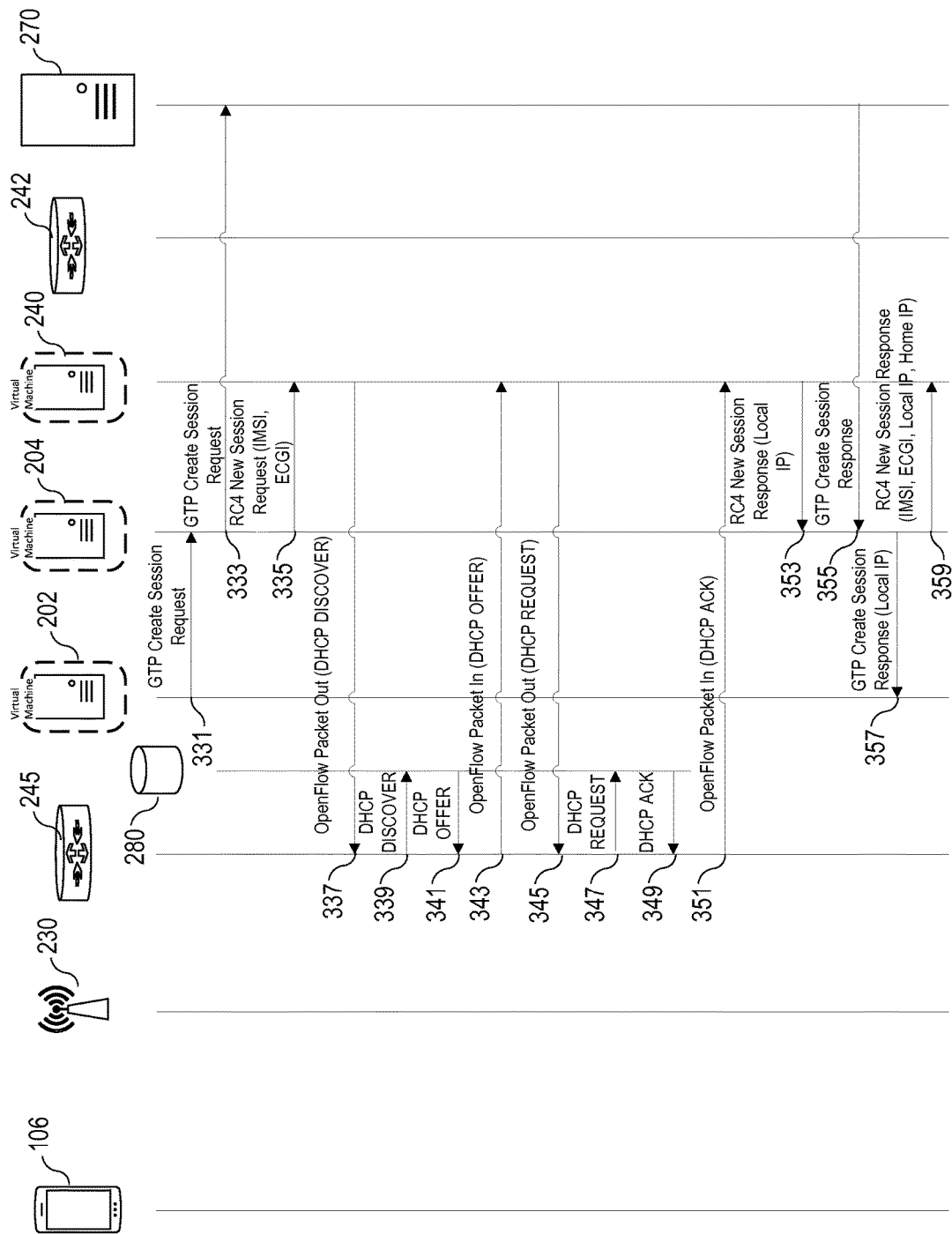
Figure 3C:
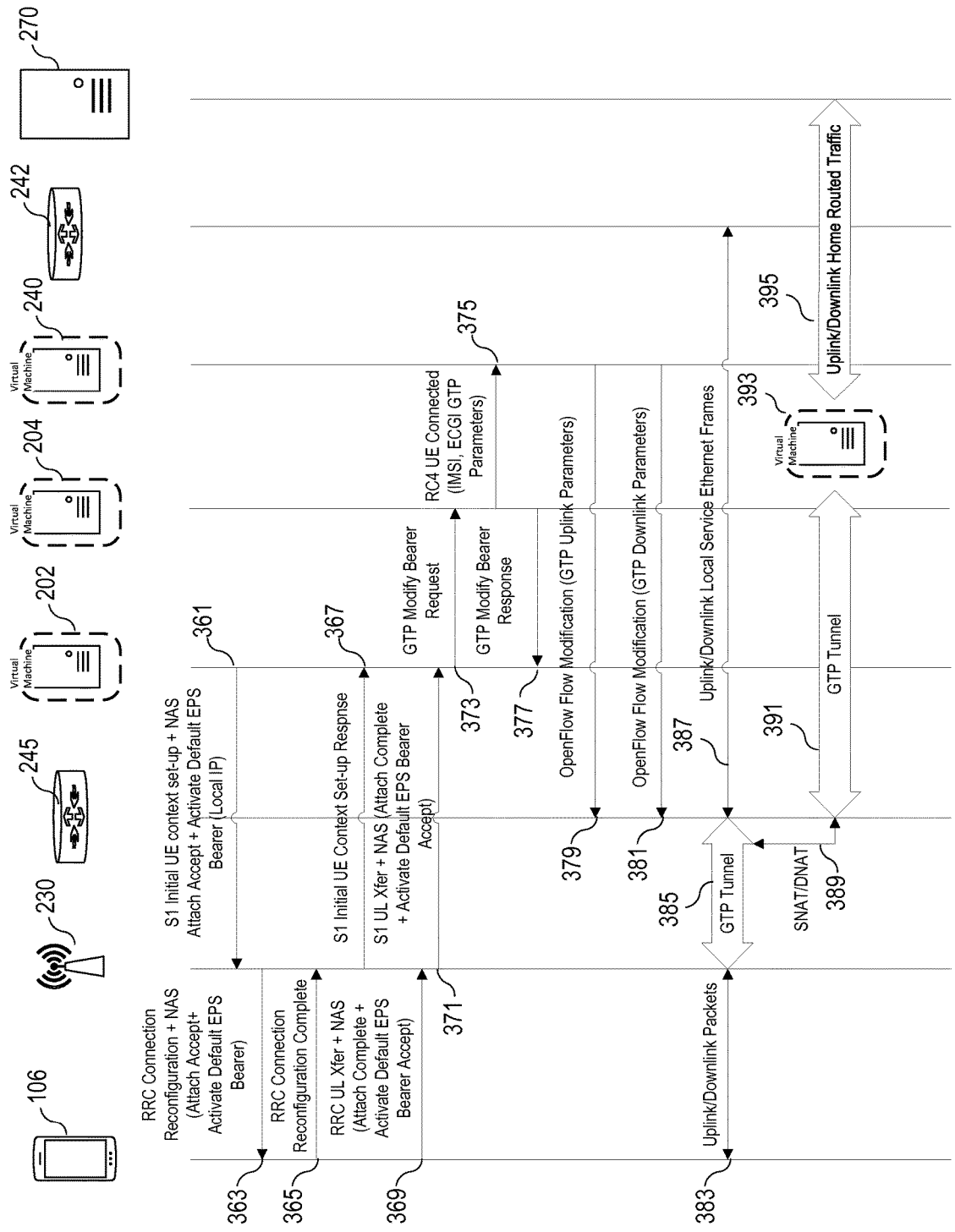

FIGS. 3A, 3B and 3C illustrate another embodiment that provides network attachment with legacy components, with an embodiment such as that of FIG. 2. In step 301, a radio resource control (RRC) connection set-up request is sent from UE 106 to legacy base station 230. The legacy base station 230 then communicates the RRC connection set-up to UE, in step 303. In step 305, the RRC connection is completed. In addition, a Non-Access Stratum (NAS) attach request(s) (e.g., attach request and packet data network (PDN) request) is sent from UE 106 to base station 230. The NAS communication protocols are defined by the 3GPP (see Non-Access-Stratum (NAS) protocol for Evolved Packet System (EPS); Stage 3, http://www.3gpp.org/DynaReport/

24301.htm, which is hereby incorporated in this specification in its entirety). In step 307, an initial S1 UE message and the NAS request are sent to the virtual machine MME 202. S1 is an application protocol established by the Third Generation Partnership Project (3GPP) (see 3GPP TS 36.413 V10.3.0 (2011-09), http://www.qtc.jp/3GPP/Specs/36413-a30.pdf, which is hereby incorporated in this specification in its entirety.)

In step 309, MME 202 sends an information authorization request to HSS 208 to determine if the user is authorized to access the data requested. In step 311, the HSS 208 answers the request of MME 202. In step 313, MME 202 sends an S1 downlink (DL) transfer request with a NAS authentication request to base station 230. In step 315, base station 230 transmits the NAS authentication request with an RRC DL transfer to UE 106. In step 317, the UE 106 sends and RRC uplink (UL) transfer with an NAS authorization response to base station 230. In step 319, base station 230 sends an S1 UL with the NAS authentication response to MME 202. In step 321, based on the authentication response, MME 202 sends an S1 DL with an NAS security mode command to base station 230. In step 323, base station 230 sends the NAS security mode command to UE 106 with an RRC DL. In step 325, UE 106 sends an NAS security mode completion signal to base station 230 with an RRC UL. In step 327, base station 230 sends an S1 UL with the NAS security mode complete signal to MME 202. This completes the authorization process for granting UE 106 access to the requested data.

In step 331 of FIG. 3B, MME 202 then sends a GPRS tunneling protocol (GTP) request to SGW 204. The GTP is a specification under 3GPP (3GPP TS 29.060 V13.0.0 (2015-03), http://www.3gpp.org/DynaReport/29060.htm, which is hereby incorporated in this specification in its entirety.) In step 333, the GTP request is forwarded to home packet gateway (home PGW) 270. In addition, in step 335, SGW 204 also sends an RC4 new session request to SDN 240. RC4 is a designation used herein to refer to a novel interface between the SGW and SDN controller. The International Mobile Subscriber Identity (IMSI) for UE 106 and the E-UTRAN Cell Global Identifier (ECGI) for the base station 230 (or its associated cell, if there is more than one base station in the cell) is provided in the RC4 new session request. In step 337, SDN 240 communicates a Dynamic Host Configuration Protocol (DHCP) discover signal to router 245, which routes the DHCP discover signal to DHCP server 280 in step 339. In step 341, DHCP server 280 provides a DHCP offer signal to router 245, which is relayed to SDN controller 240 via OpenFlow in step 343.

In step 347, SDN controller 240 sends, via OpenFlow, a DCHP request, which is relayed by router 245 to DHCP server 280 in step 347. In step 349, DHCP server 280 sends an acknowledgement (ACK) signal, which includes the parameters including the Internet Protocol (IP) address that have been assigned to the UE 106, which is relayed to SDN controller 240 in step 351. The IP information is used by SDN controller to respond to the SGW on the RC4 interface and transmit the necessary information to SGW 204 in step 353. SDN controller 240 also receives a GTP session response from home PGW 270. In step 357, a GTP create session response with the local IP information or home IP information is transmitted to MME 202. In step 359, the RC4 new session response is sent from SGW 204 to SDN controller 240 with the IMSI, ECGI, Local and Home IP information.

In step 361 of FIG. 3C, MME 202 uses the information from the GTP create session response to generate and transmit to legacy base station 230 a UE context set up message with an NAS attach accept message and a message to activate a default evolved packet system (EPS) bearer. In step 363, this information is transmitted to UE 106 using RRC, followed by a reconfiguration acknowledgement from UE 106 to legacy base station 230 in step 365. In step 367, the legacy base station relays the UE context step-up response and in step 369, UE 106 uploads attach complete and EPS bearer accept messages. This information is relayed from legacy base station 230 to MME 202 in step 371. In step 373 the MME 202 requests a modification of the GTP from SGW 204 to reflect the bearer information received form UE 106 via legacy base station 230. The SGW then sends a UE Connected message to SDN controller 240 on the RC4 interface with this information and confirms that a bearer has been accepted in step 375. SDN controller 240 relays the bearer information to router 245 to establish GTP UL parameters (step 379) and GTP DL parameters (step 381).

The GTP tunnel 385 is thus established between the legacy base station 230 and router 245. Uplink and downlink transmissions are provided from UE 106 to legacy base station 230 via the EPS bearer previously established. This data can be routed by router 245 locally to another router 242 using link 387 or via another GTP tunnel 391 to any SGW 393 and on to any network destination from SGW 393. For example, SGW 393 may be a gateway to an enterprise system and the data can be linked to a home server 270 to access the enterprise facilities.

Depending on which address (local or home) was sent to the MME in step 357, source network address translation (SNAT) and destination network address translation (DNAT) may be required in the router 245. For example, if the local IP was sent to the MME, then packets destined for the home network will need to have SNAT and DNAT applied. Alternatively, if the home IP was sent to the MME, then packets destined for the local network will need to have SNAT and DNAT applied.

Figure 4:
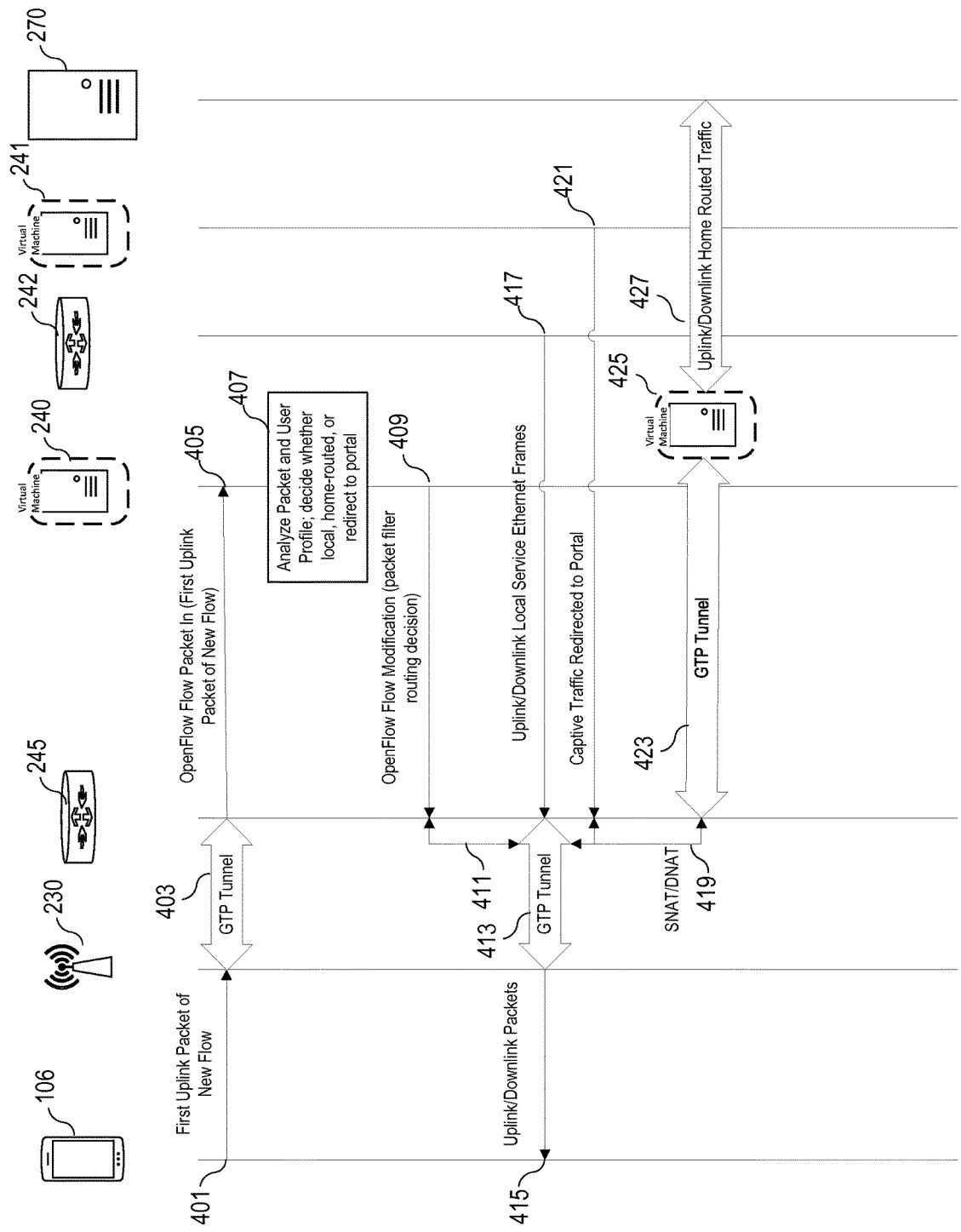
FIG. 4 illustrates flow establishment with the embodiment of FIG. 2.

FIG. 4 illustrates the capability of the links established in the process explained in FIGS. 3A-3C. Uplink packet travel begins at step 401 by transmission from UE 106 to legacy base station 230. Using the GTP tunnel link 403, the uplink information is transmitted to router 245. Because, router 245 is a software defined router under the control of SDN controller 240, there is an established OpenFlow link 405 to SDN controller 240. In step 407, the first uplink packet is analyzed by SDN controller 240 and routing instructions 401 are transmitted to router 245. Using these instructions, the data can be transmitted anywhere without entering the control plane, unless the destination is in the control plane. For example, a link to a local router 417 can be transmitted directly using Ethernet frames. A link to a portal 241 can be established using SNAT/DNAT 419. Even a link to a destination in the control plane is more direct and thus has a lower latency using the described embodiments. For example, using SNAT/DNAT 419 from the GTP tunnel 413, a link to GTP tunnel 423 can be used to connect to SGW 425. The SGW 425 is in turn has a link 427 to home server 270. The first element in the control plane that this link uses is SGW 425.

The embodiments described in FIGS. 3-4 combine virtualized legacy nodes 202,204,206, 208, 210, 212, 214 (MME, PGW, SGW, AC, etc.) with the more modern SDN architecture. The GPRS tunneling protocol (GTP)/generic routing encapsulation (GRE) tunnel 235 is terminated at or close to the base station. Generally, there is no need for long-distance detours for local traffic.

An embodiment provides centralized per-flow policy decisions. This allows set up of routing (peer-to-peer, multicast, copy for lawful intercept) based on arbitrary rules. Applications can affect policy through the northbound API 255 (FIG. 2).

An embodiment provides multiple simultaneous service models (e.g., local services, home routed services, captive portal services, etc.). The user equipment (UE) sees only a single internet protocol (IP) address.

Figure 5:
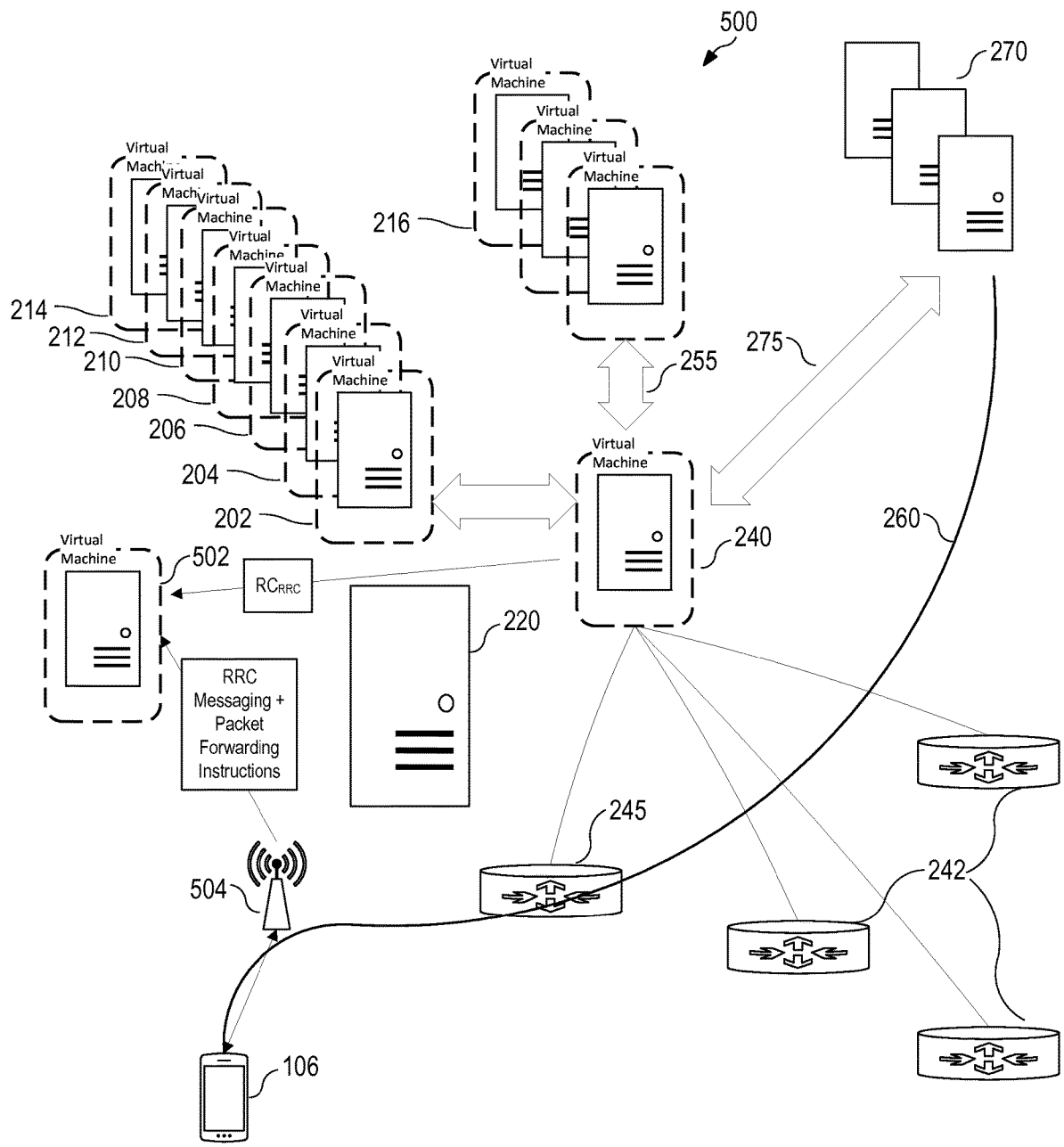
FIG. 5 illustrates an embodiment evolved software programmable radio network (SPRN)

FIG. 5 illustrates an evolved software programmable radio network (eSPRN) 500 that is an embodiment. In this embodiment, radio resource control (RRC) is moved out of BS 504 and onto a centralized platform. All RRC traffic is directed to virtualized RRC server 502. RRC server 502 is exposed through the northbound API 255 through SDN server 240. This enables customized mobility management on a per-application basis. This also enables rapid deployment of new features that normally would require a BS upgrade. This also dramatically reduces the amount of code in the BS.

The eSPRN 500 allows direct control of packet forwarding on the BS 504 itself. There is no need for a GTP tunnel at all. An embodiment provides the most optimal routing. For example, for two UEs on the same BS, traffic need never leave the BS. The BS can peer with any other node in the network in an arbitrary topology.

The interface to BS 504 can be, for example, modified OpenFlow or OpenFlow plus some additional protocol. RRC server 502 may or may not implement S1 toward a traditional MME. SDN controller 240 can implement S6a to an HSS directly and handle all MME functions. In this case RC4 is not necessary. S6a is an interface standard promulgated by 3GPP (see Evolved Packet System (EPS)—MME and SGSN related interfaces based on Diameter protocol, http://www.in2eps.com/3g29/tk-3gpp-29-272.html, which is incorporated herein by reference in its entirety).

Figure 6A:
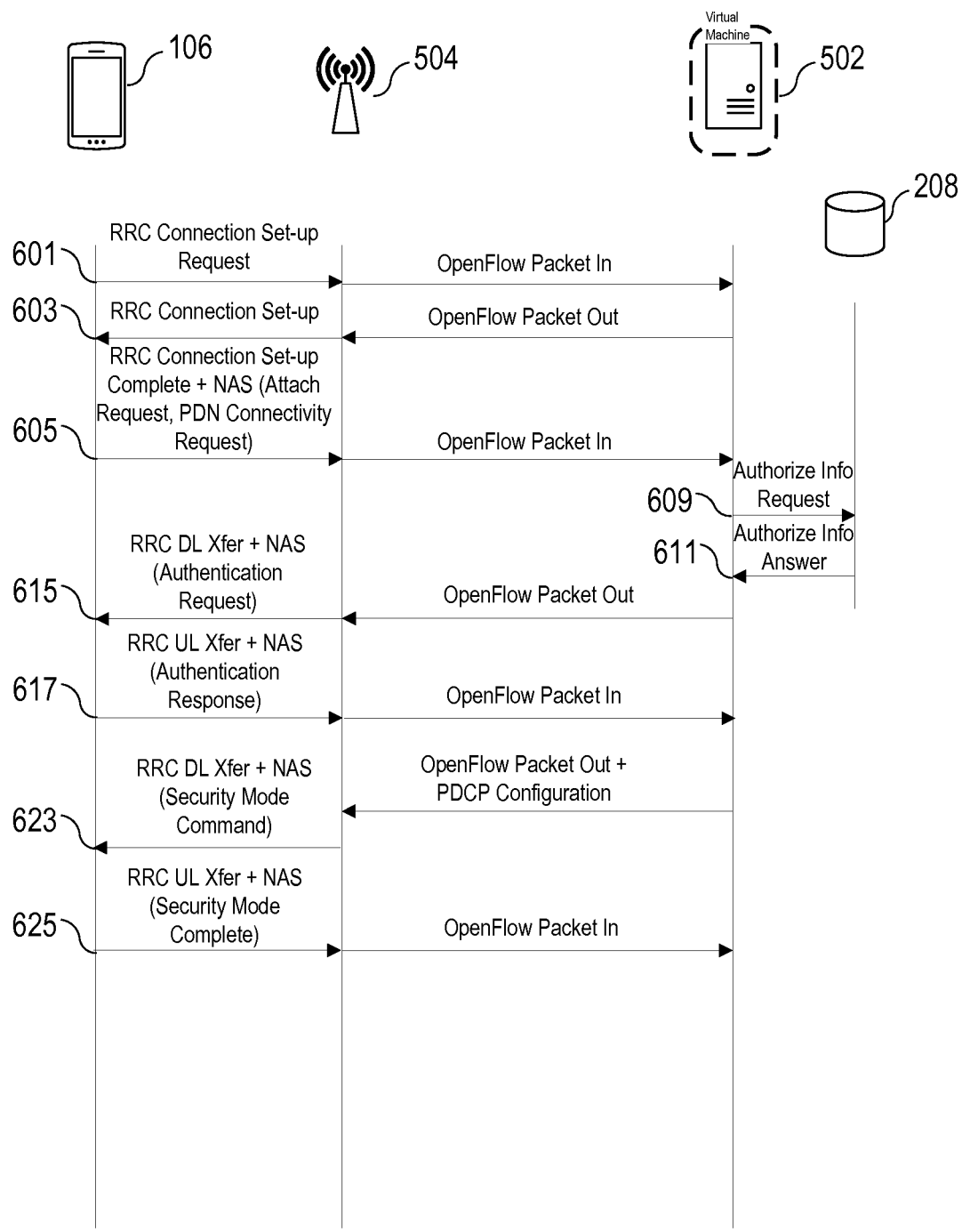
FIGS. 6A and 6B illustrate network attachment in the embodiment of FIG. 5.
Figure 6B:
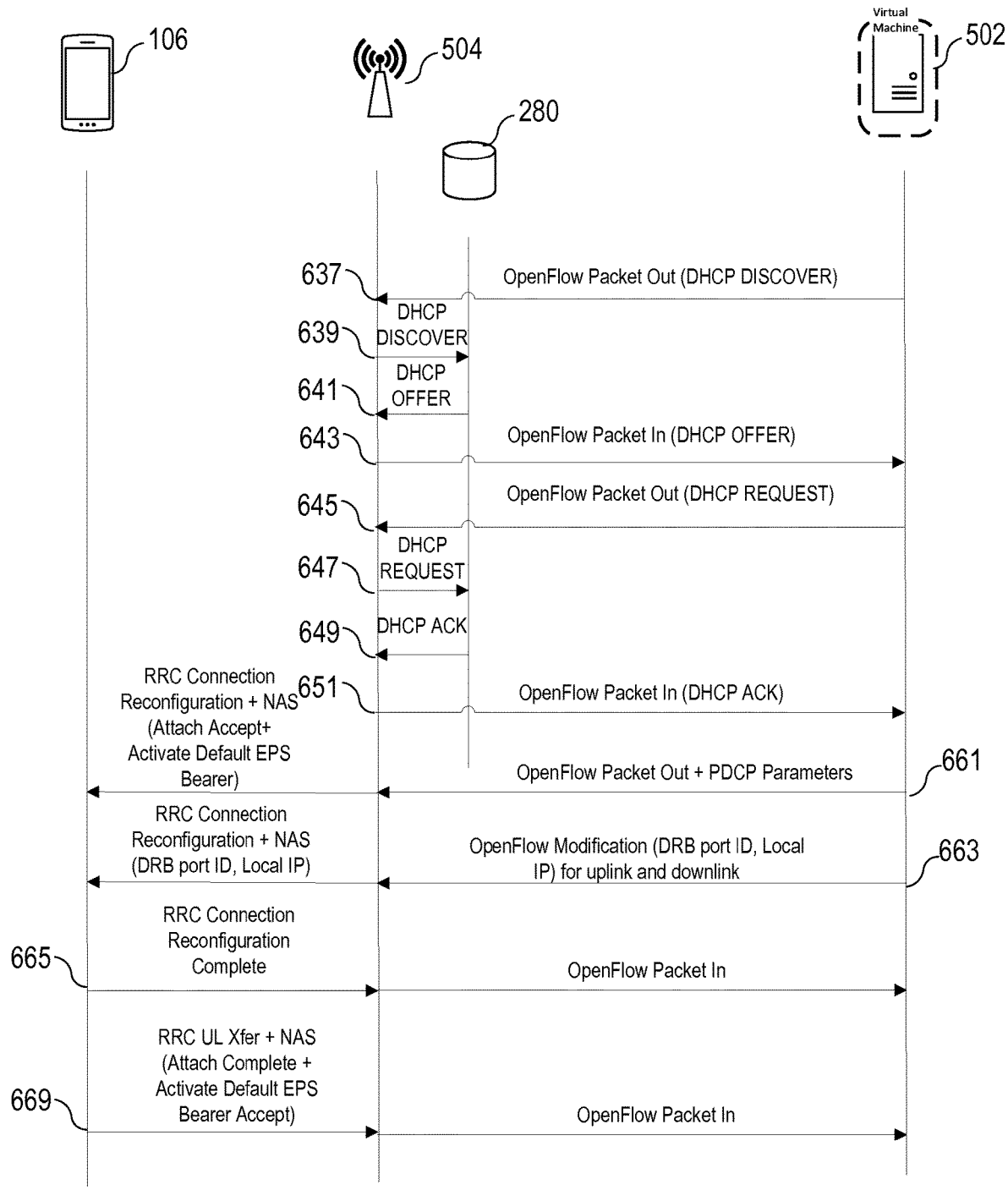
Figure 7:
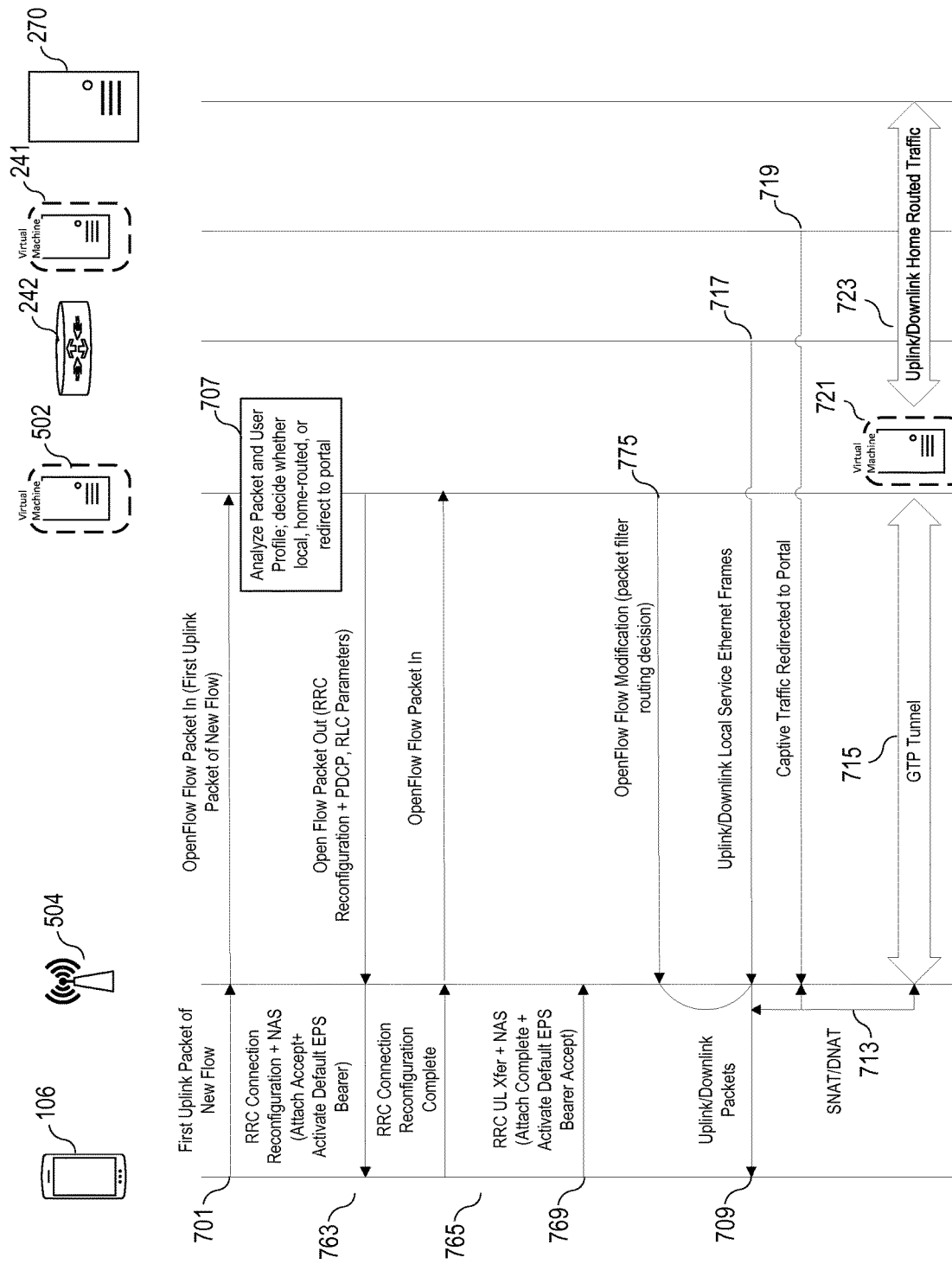
FIG. 7 illustrates flow establishment in the embodiment of FIG. 5.

FIGS. 6A and 6B illustrate network attachment in eSPRN 500, and FIG. 7 illustrates flow establishment in eSPRN 500. In step 601 of FIG. 6A, UE 106 sends an RRC connection request to BS 504, which is forwarded to RRC server 502. In step 60, RRC server 502 sends a response using OpenFlow packets, which is forwarded to UE 106 by BS 504. In step 605, the RRC connection set up is complete and an NAS attachment request is sent to BS 504, which is forwarded to RRC server 502, and then forwarded to HSS server 208 in step 609. The HSS server 208 answers in step 611. The answer is transmitted to BS 504 using OpenFlow and forwarded to the UE 106 as an RRC DL transfer with an NAS authentication request. UE 106 provides an authentication response in step 617, which is forwarded to RRC server 502. RRC server 502 responds with PDCP configuration information, which BS 504 forwards as a security mode command in step 623. In step 625, the secure link is completed.

In steps 637-651 of FIG. 6B, RRC server 502 negotiates with DHCP server 280, just as SDN controller 240 did in the process of FIG. 3B. In steps 661 and 663, the RRC server 502 transmits the connection configuration information received from DHCP server 280, which is forwarded by BS 504 to UE 106. In steps 665 and 669, UE 106 acknowledges that the EPS bearer has been established in accordance with the information from DHCP server 280 and begins transmission.

FIG. 7 illustrates the capability of the links established in the process of FIGS. 6A and 6B. Uplink packet travel begins at step 701 by transmission from UE 106 to BS 504, which is forwarded to RRC server 502. In step 707, the first uplink packet is analyzed by RRC server 502. Reconfiguration instructions are transmitted from RRC server 502 through BS 504 to UE 106 in step 763. The reconfiguration is accepted and acknowledged in steps 765 and 769. Routing instructions are transmitted to BS 504 in step 709. Using these instructions, the data can be transmitted anywhere without entering the control plane, unless the destination is in the control plane. For example, a link 717 to a local router 242 can be transmitted directly using Ethernet frames. A link 719 to a portal 241 can be established using SNAT/DNAT 719. A link to a destination in the control plane is more direct and thus has a lower latency using the described embodiments. For example, using SNAT/DNAT 713 from the GTP tunnel 715, a link to GTP tunnel 723 can be used to connect to SGW 725. The SGW 725 in turn has a link 727 to home server 270. The first element in the control plane that this link uses is SGW 725.

In this embodiment, using the evolved SPRN provides a centralized RRC. Decisions about mobility management, neighbor measurement prioritization are made in concert with packet routing decisions and user profile/application information. This provides simplified call flows. There is no need for S1 or S5 interfaces. An embodiment provides integration of dedicated bearer establishment with SDN-controlled packet routing. packet data control protocol (PDCP) and radio link control (RLC) parameters can be tuned based on application knowledge.

As discussed above, a software programmable radio network, such as the SPRN with legacy components shown FIG. 2, and the evolved SPRN shown in FIG. 5, enable flexible policy decisions on a per-flow basis. Further embodiments described below provide systems and methods for making and disseminating local policy decisions, such as routing configurations, in a software programmable radio network. These embodiments include inputs to policy decision, mechanisms for getting inputs to a policy decision point, policy decision outputs, and mechanisms for getting outputs to a policy enforcement point.

Figure 1:
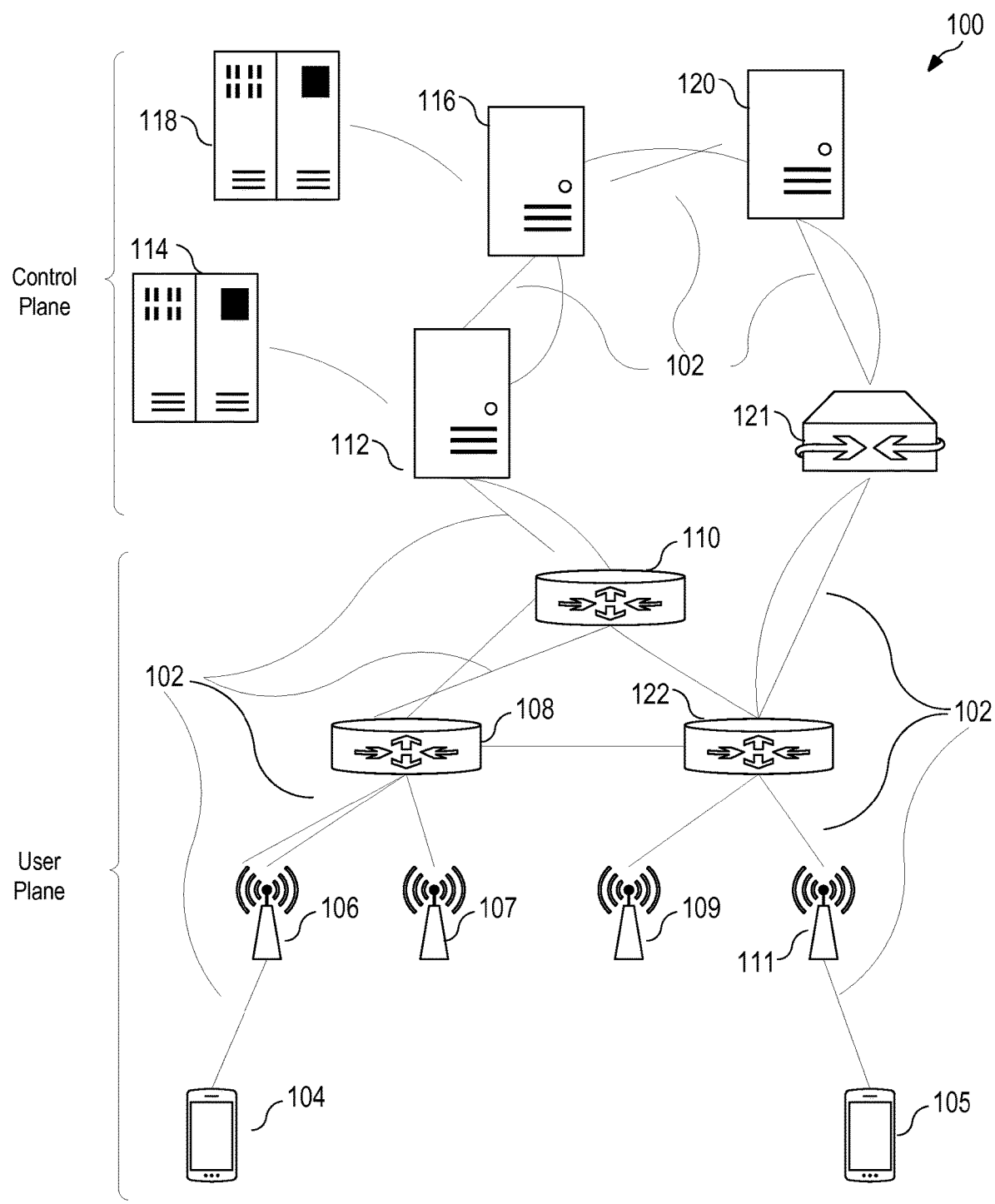
FIG. 1 illustrates an example existing approach to wireless networking.
Figure 8A:
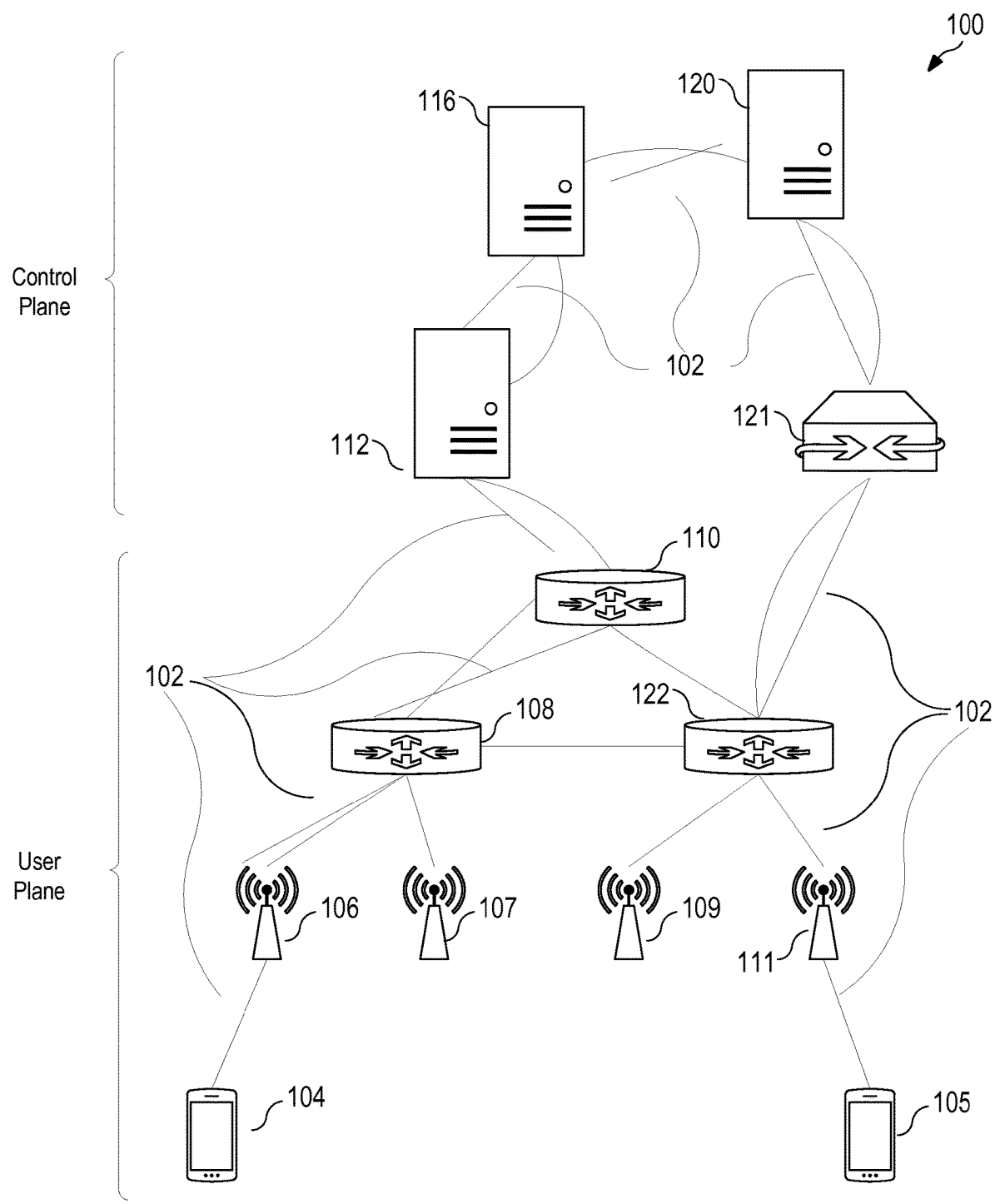
FIGS. 8A and 8B illustrate the operation of a network without and with an embodiment, respectively.

FIG. 8A is a simplified version of FIG. 1 showing high latency data path 102. In contrast is the path 802 shown in FIG. 8B. Using one of the described embodiments simplifies the same connection between UE 104 and UE 105 to the path designated 802, which never touches the control plane. In fact, the control plane is omitted from FIG. 8B.

An embodiment separates the policy decision point (e.g., an SDN controller) from the policy enforcement/implementation points (e.g., OpenFlow switches and OpenFlow-enabled base stations). An embodiment provides flexible routing, mobility management, and RRC policy in a scalable and efficient manner, without requiring user plane traffic to traverse unnecessary network elements. Example inputs to policy decision making include a user profile (IMSI prefix, NAI suffix), a local group-based policy database (can be updated through the northbound API), a first packet of flow (source/destination IP address, source/destination port, transport protocol), and northbound API (applications (e.g., portal) can use representational state transfer (REST) API to push specific policy for specific flow). Example policy outputs include allow/deny, local/home route/redirect, routing decisions (P2P, multicast), dedicated bearer instantiation (quality of service (QoS), QoS class Identifier (QCI), bandwidth parameters), and RRC operation (neighbor priorities, handover decisions; used in evolved architecture where RRC has been moved).

An example policy is localized P2P traffic routing. Mobile to mobile traffic in a traditional wireless network is handled inefficiently. The traffic is often tunneled back to a central location before routing to its destination. If two nodes are attached to the same base station, this can lead to very sub-optimal routing, such as increased utilization of backhaul links, and increased latency introduced to the communication session (e.g., route 102 of FIG. 8A).

Figure 8B:
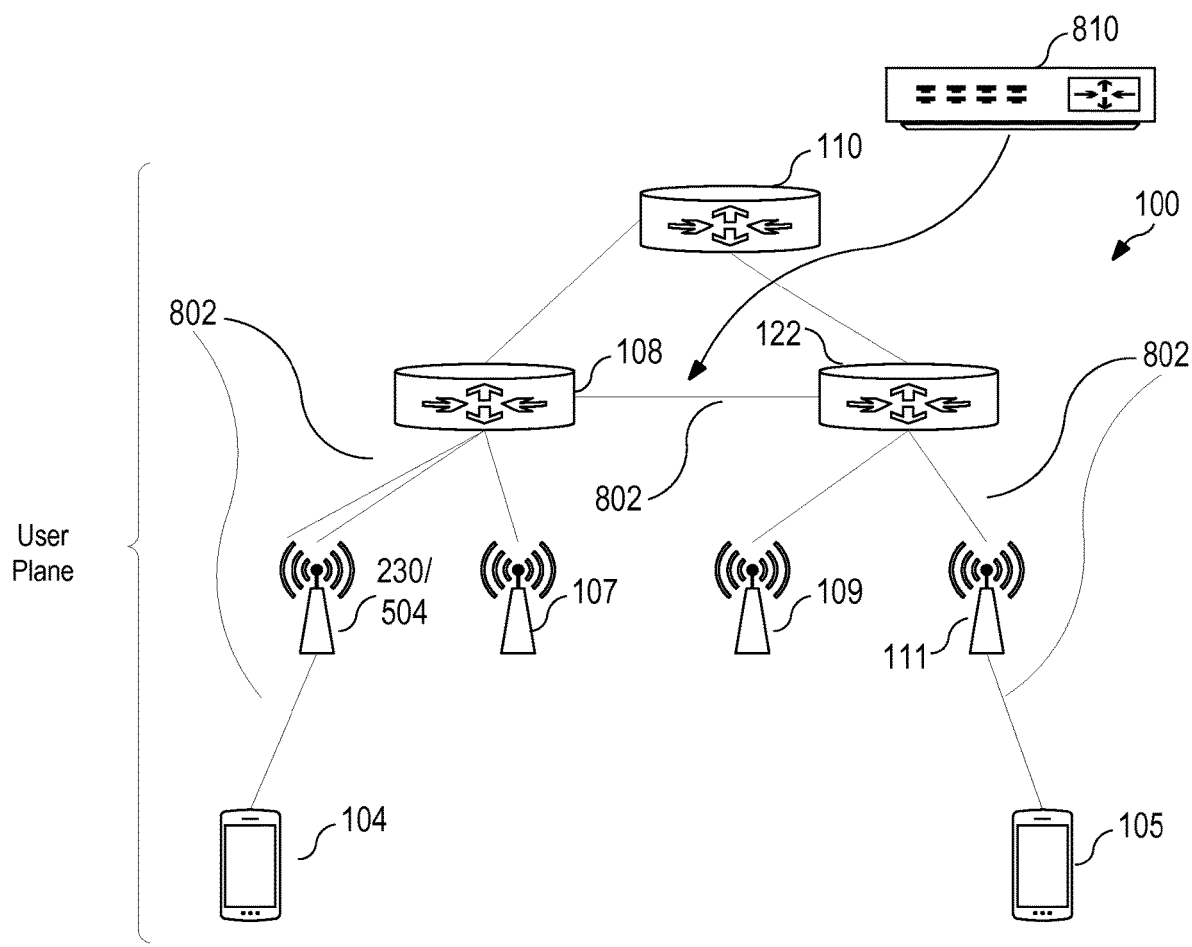

An embodiment uses software programmable networking to route traffic directly between peers attached to a wireless network (e.g., route 802 of FIG. 8B). An embodiment such as eSPRN 500 of FIG. 5 reduces expenditure for tunnel termination equipment and link bandwidth (capex+opex) and reduces latency of the traffic path. An embodiment provides operator cost savings and improved user experience.

An embodiment (e.g., SPRN 200 of FIG. 2 or eSPRN 500 of FIG. 5) provides a programmable user-plane co-located at each base station (e.g., OpenVSwitch) signaling interfaces to a controller (e.g., the MME/SGW/AC) informs the controller about attachment and mobility events of each UE. The northbound API 255 allows applications to influence routing & mobility policy.

An embodiment implements algorithms and logic in the controller to receive the first packet of each flow, analyze to determine whether the destination is a local node, set up a routing path from source to destination(s), and track mobility events and update the path as needed.

Figure 9:
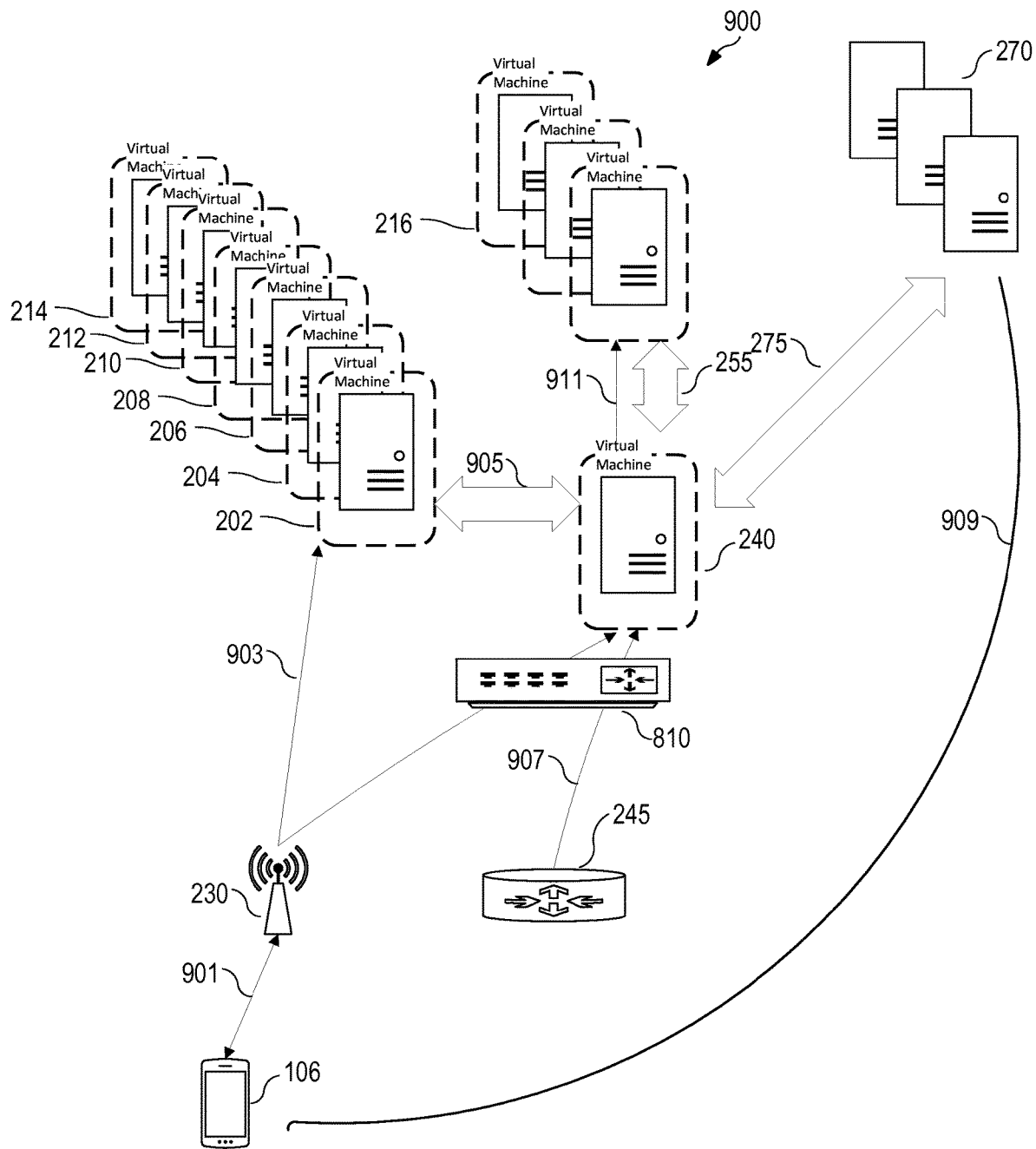
FIG. 9 illustrates session startup in another embodiment SPRN.

FIG. 9 illustrates software defined radio network (SDRN) session startup on another embodiment eSPRN 900, including the following activities:

1. Initial attach/association 901. LTE: non-access stratum (NAS) messages; WiFi: association.
2. Authentication/radio bearer setup 903. With an LTE network, this step will involve authentication and key agreement (AKA), PDCP setup. With a WiFi network, this step will involve 802.1X (extensible authentication protocol (EAP)).
3. SDRN Triggers 905. With an LTE network, this step will involve MME 202 or SGW 112 signals to SDRN 240. With a WiFi network, this step will involve AC signals to SDRN 240.
4. Packet forwarding set-up 907. This step involves sending OpenFlow set-up messages to e.g., routers 245, switches 810, and base stations 230.
5. Application/portal session initiation 909. E.g., redirection to captive portal; enterprise application sessions.
6. Northbound queries/commands 911. Applications can find international mobile subscriber identity (IMSI) or network access identifier (NAI) (authenticated identifiers) of UEs from IP addresses. The queries/commands can be used to index user profiles or control access to different parts of applications. Further, applications can update network policies in SDRN controller.

Figure 10:
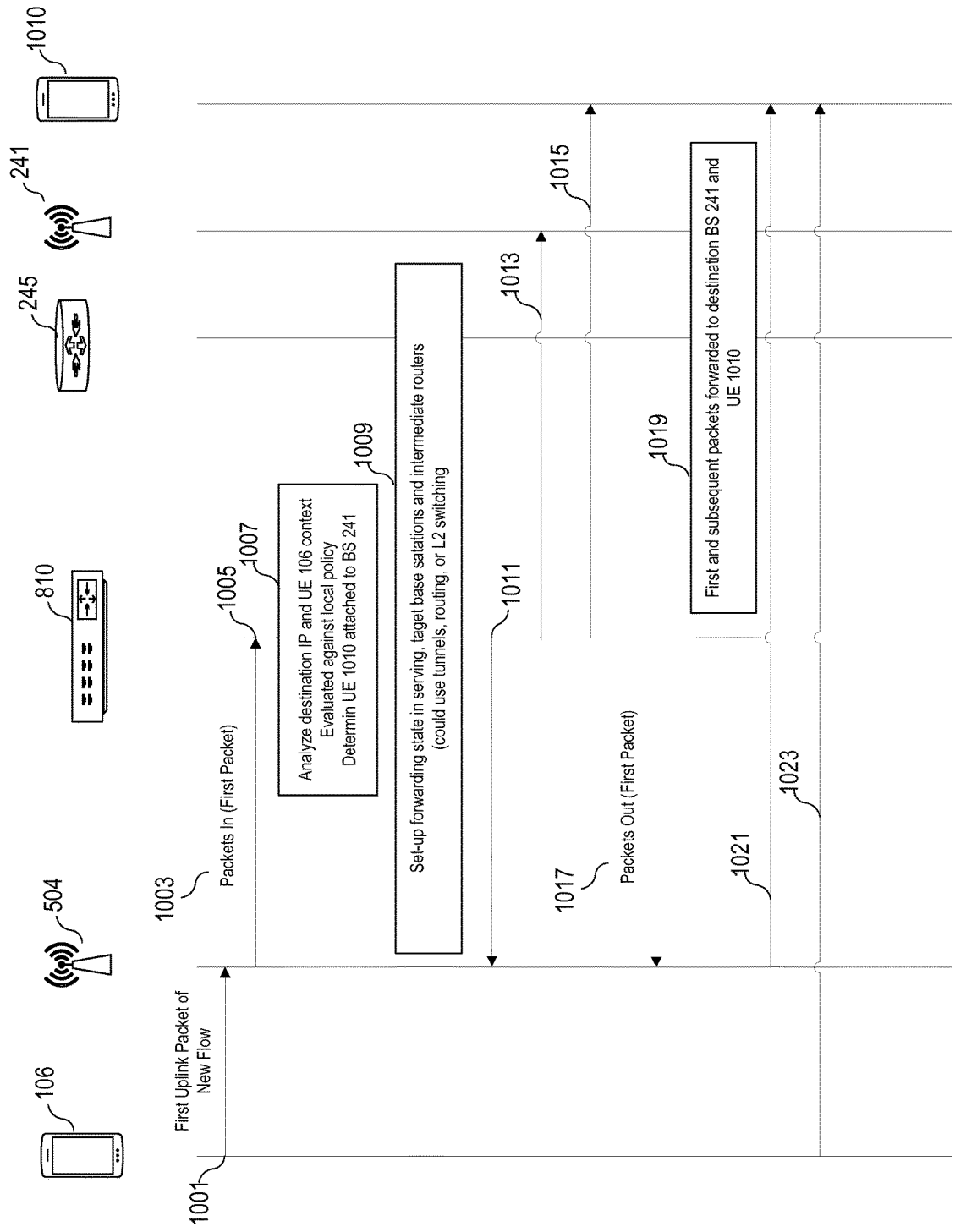
FIG. 10 illustrates P2P call flow in the embodiment of FIG. 9.

FIG. 10 illustrates P2P call flow on a network such as eSPRN 900. Traffic setup occurs for each direction. In this illustrated process, traffic set-up is initiated in step 1001 by UE 106 sending a packet to BS 504. The packet is forwarded to software defined network switch 810 in step 1003, which analyzes the packet for appropriate routing in step 1007. In step 1009, the appropriate routing is established and transmitted to the relevant equipment (steps 1011, 1013 and 1015). The forwarding state may include tunnels, routing, L2 switching, or a combination of all three. GTP tunnels can be logically terminated inside the serving base station, using L3 routing or L2 switching to get the packets to the target base station, which can use a logical (internal) GTP tunnel to the radio interface. In step 1017, the first packet is routed back to base station 504. The first and all subsequent packets in this transmission are forwarded to BS 241 and UE 1010 (steps 1019, 1021 and 1023). In some cases, BS 504 and BS 241 may be the same base station. In this case, a hairpin forwarding state is installed so that packets can stay within the base station during operation.

Usage scenarios for the described embodiments include enterprise applications (direct access to workgroup servers based on wireless access credentials), small team meetings (controlled P2P workgroups can be set up dynamically by applications, e.g., keeping E-space sessions within the company or team across LTE and WiFi), hospital multimedia records sharing (dynamic access to patient's test results, scans, and records by multiple doctors based on HIPPA constraints), public venue chat/gaming (protected virtual private network among friends/family requested through web portal), machine-to-machine communication (local traffic does not need to traverse remote PGW(s)), and the like. Of course, the utility of the described embodiments is not limited to these examples and those skilled in the art will determine many other useful applications of the techniques described herein.

Figure 11:
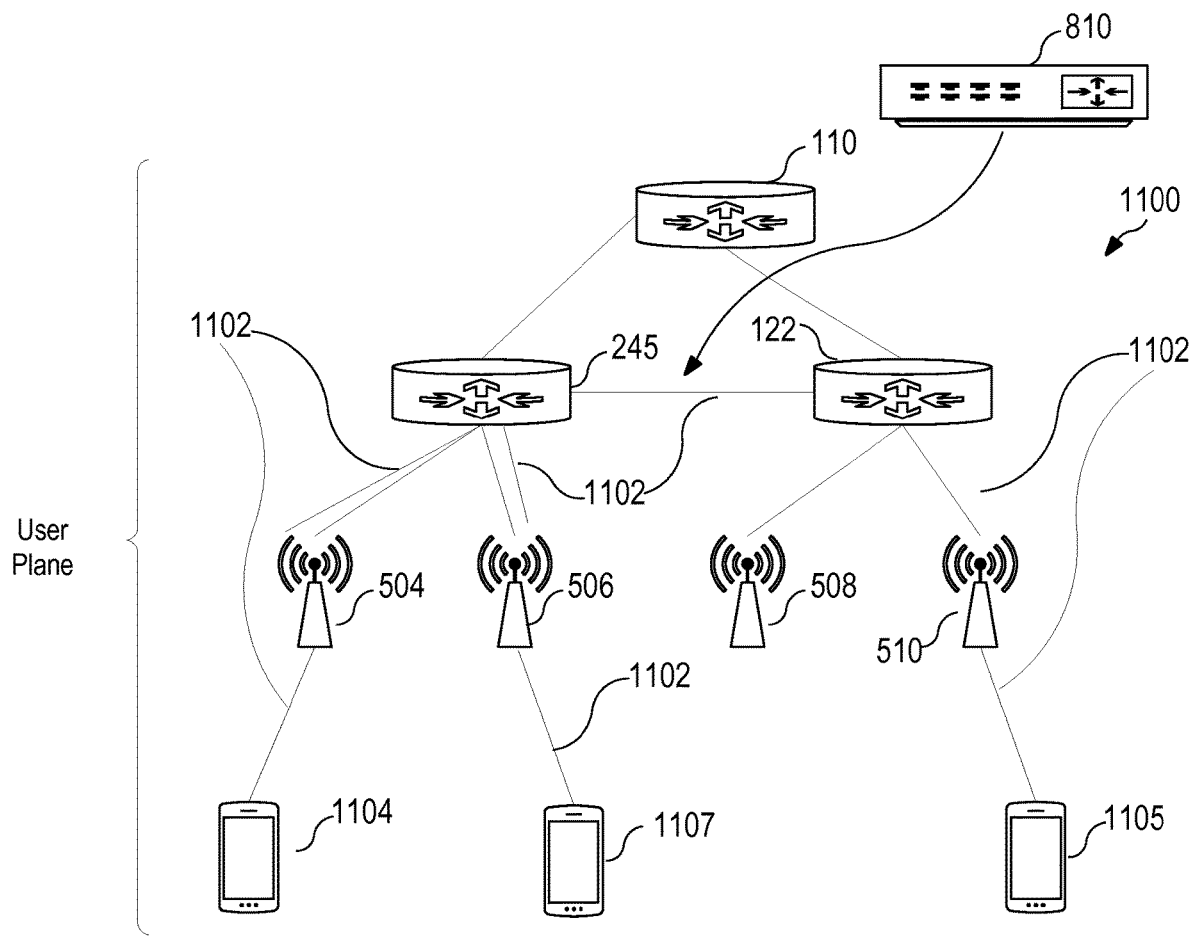
FIG. 11 illustrates a policy example using the embodiment of FIG. 9 with efficient peer to peer multicast.

FIG. 11 illustrates a policy example with efficient peer to peer multicast, with a many-to-many communication pattern. In network 1100, the SDRN 810 controller sets-up and maintains a spanning tree as nodes, such as SDN router 245. In this example, the packets transmitted from UE 1104 are duplicated in SDN router 245. The duplicate packets are routed to UE 1105 and UE 1107. Thus data follows route 1102.

Figure 12:
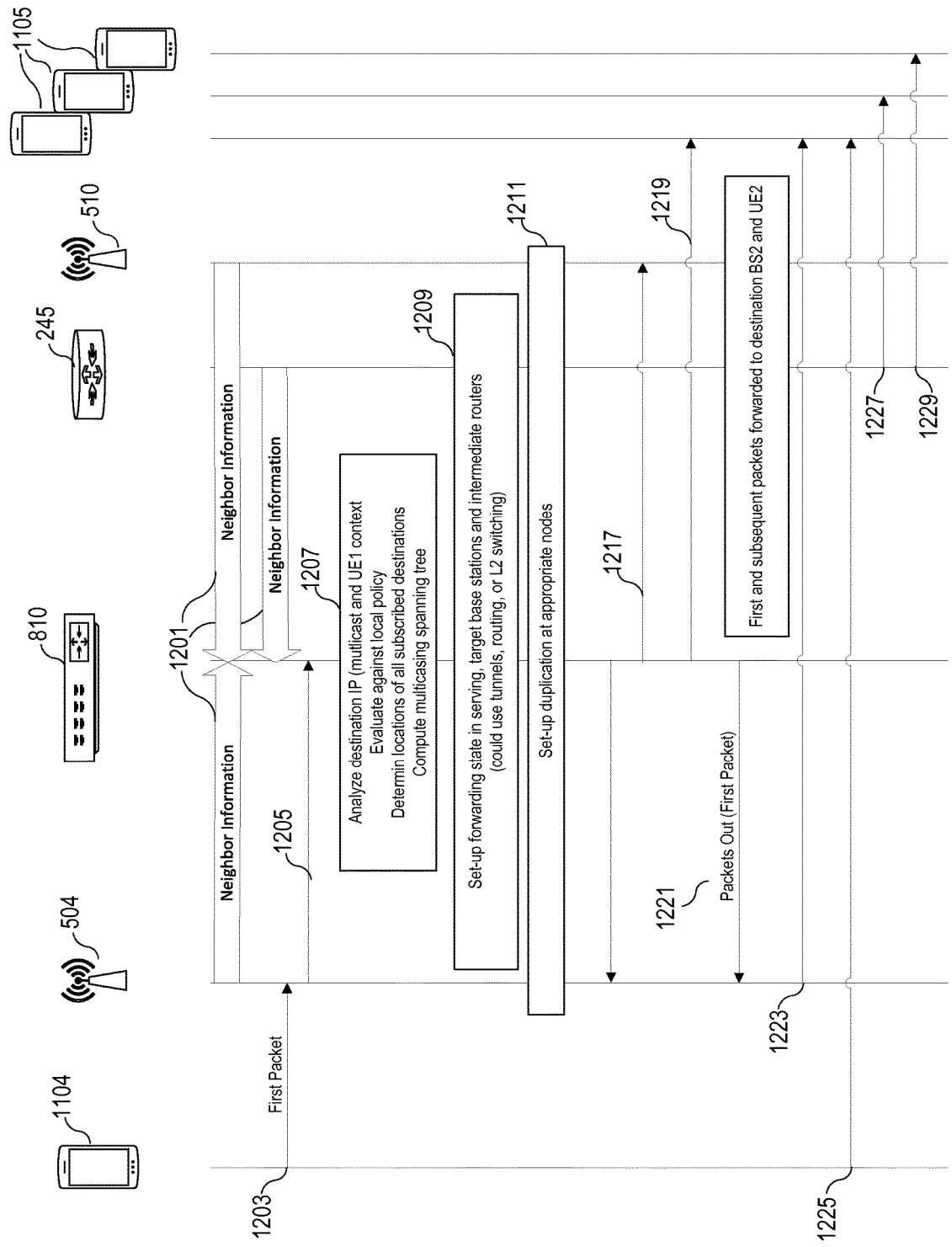
FIG. 12 illustrates multicast call flow with the embodiment of FIG. 9.

FIG. 12 illustrates the multicast call flow of FIG. 11. In step 1201, BS 504, SDN router 810, SDN router 245 and other connected devices related to traffic flow constantly monitor the connected UEs and communicate their position in the network to provide neighbor information. These UEs may be a selected group that are identified by the IMSI, for example. Just as with the process of FIG. 10, the first packet from UE is transmitted to SDN router 810. Either by software loaded locally or by software loaded from the Northbound API 255 through SDN controller 240, SDN 810 analyzes the packet in step 1207 and determines the appropriate routing based on the neighbor information. In step 1209, SDN 810 sets-up a forwarding state in serving nodes, target base stations and intermediate routers, which may use tunnels, routing, or L2 switching. The information is processed in one of the SDN nodes 504, 245, 810 or 510, and duplication is set-up at the appropriate nodes in step 1211. The first packet is then returned to BS 504 in step 1221, which is then routed to the other UEs 1105 in steps 1223, 1225, 1227 and 1229 according to the forwarding state established in step 1209.

Figure 13:
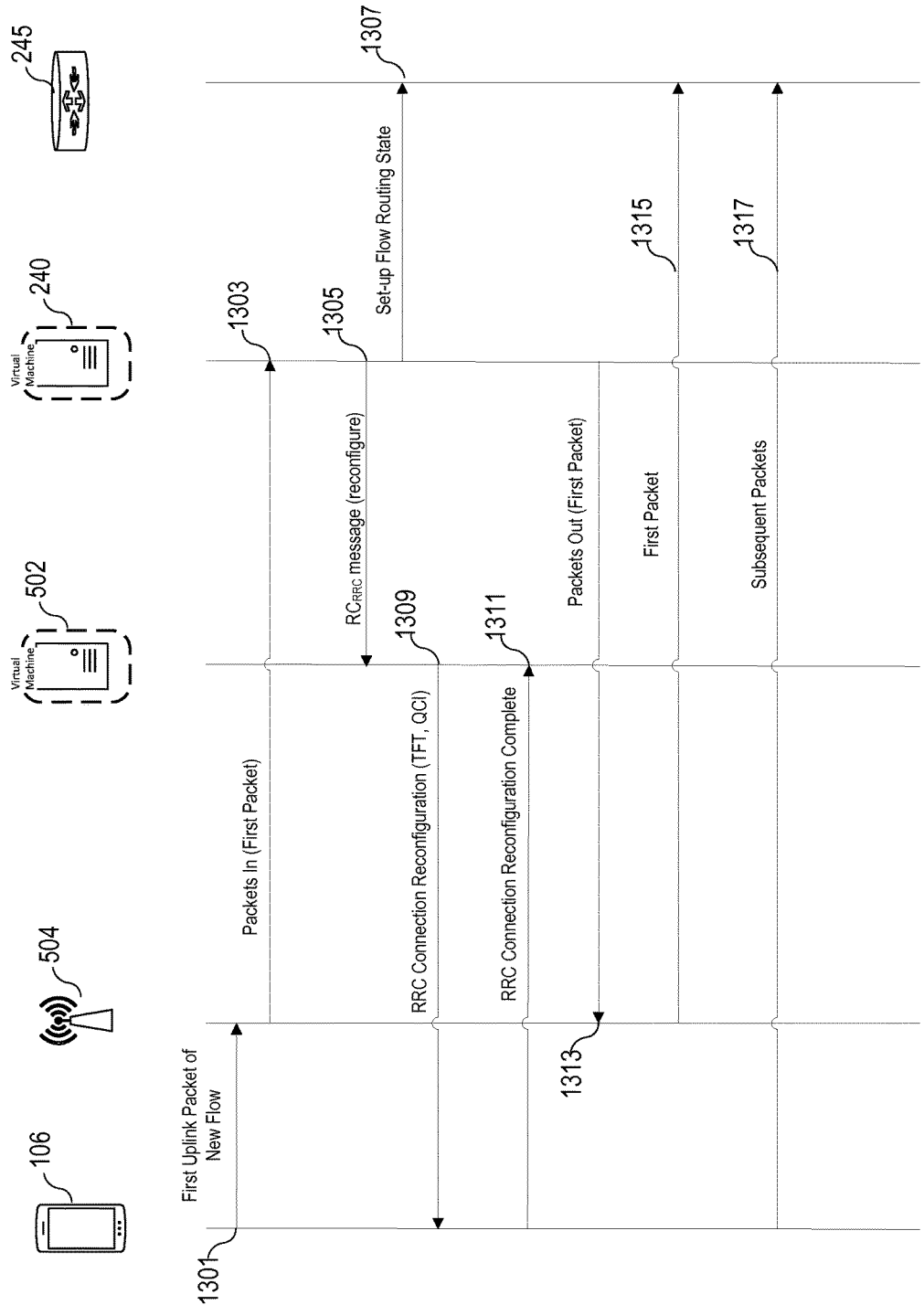
FIG. 13 illustrates RRC operation call flow with the embodiment of FIG. 9.

Another policy example is RRC operation. FIG. 13 illustrates RRC operation call flow. In step 1301, the first uplink packet of a new flow is sent by UE 106 to BS 504. In step 1303, this is forwarded to SDN controller 240. In step 1305, SDN controller 240 sends an $RC_{RRC}$ reconfiguration message to RRC controller 502. Also, in step 1307, SDN controller 240 sends a flow routing state to SDN router 245, for example, and any other router necessary for the transmission path of the uplink. In response to the $RC_{RRC}$ reconfiguration message, RRC server 502 sends a reconfiguration message including a quality-of-service (QoS) class identifier (QCI) bearer and traffic flow template (TFT) bearer, to UE 106 in step 1309, which is acknowledged in step 1311. The first packet is forwarded by SDN controller 240 to BS 504, which forwards it to its designated destination(s) in step 1315. Subsequent packets are sent from UE 106 to the designated destination(s) in step 1317. Intermediate nodes on this destination are omitted for simplicity.

Thus, an uplink from UE 106 triggers establishment of dedicated radio bearer for certain flows under control of application servers (via northbound API). Some neighbors are prioritized based on signal strength measurement during handover.

Figure 14A:
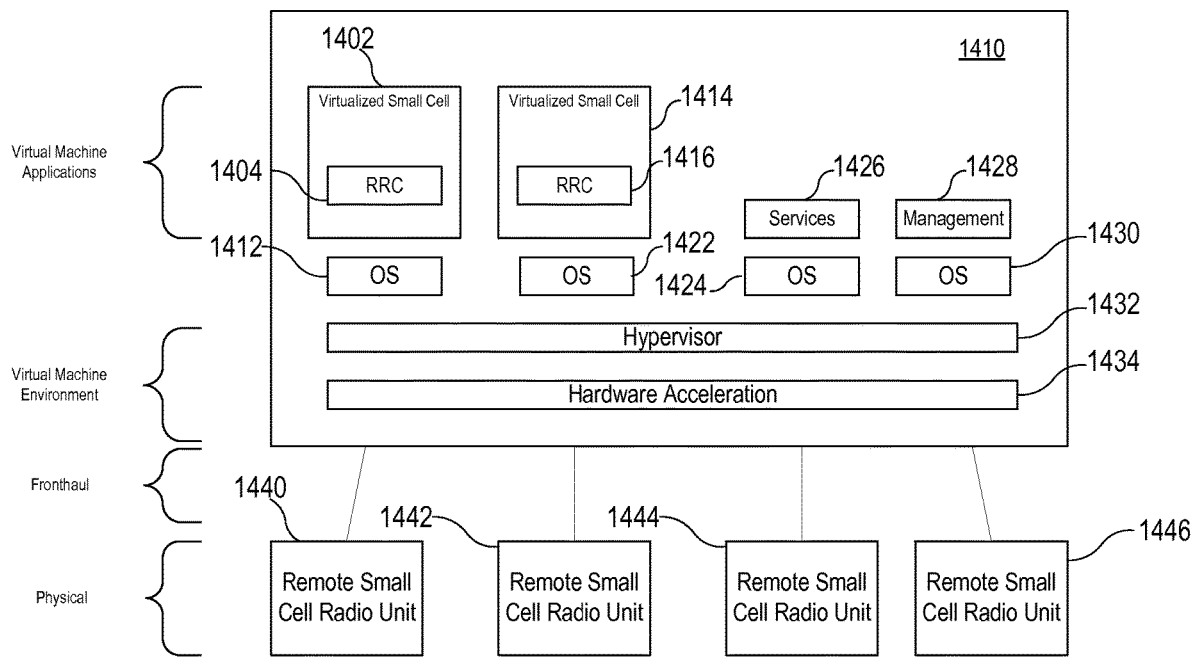
FIGS. 14A and 14B illustrate a network using small cell radio units, which is another embodiment.
Figure 14B:
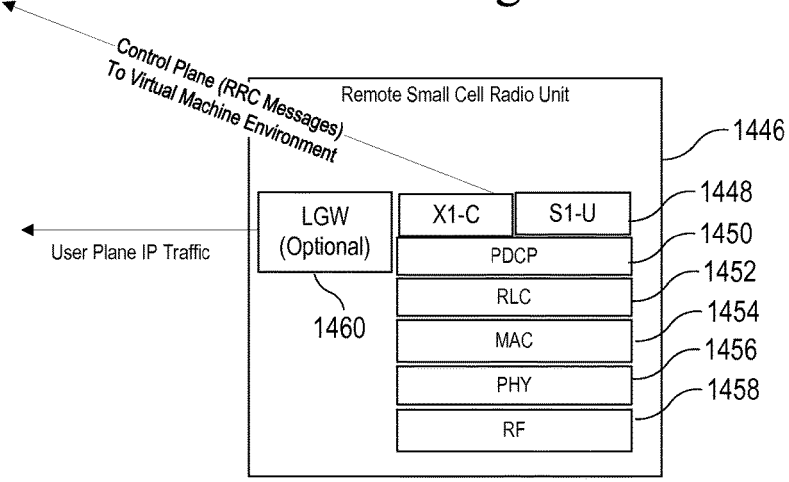

FIGS. 14A and 14B illustrate another embodiment using small radio cells. In FIG. 14A, all but a few functions are virtualized in virtual environment 1410. A number of small cell radio units communicate directly into virtual environment 1410. Not shown in FIG. 14A is a plurality of computing and communication resources in virtual environment 1410. To maximize throughput, hardware acceleration 1434 is provided. Control of the virtual environment is provided by hypervisor 1432. A plurality of operating system (OS) instances (OS 1412, 1422, 1424, 1430) run under the supervision of hypervisor 1432. In addition, a services unit 1426 is provided to provide various system services to the virtualized machines in virtual environment 1410. In addition, a virtual machine management unit 1428 provides facilities to load, remove, configure and reconfigure functionality in virtual machines in both virtual environment 1410 and on the remote small cell radio units (1440, 1442, 1444 and 1446, discussed below). Although four OS instances are shown, a typical installation would include hundreds or thousands of virtual machines, each with its own OS instance. As much communication control as possible is handled by virtualized small cells. Two examples of this are virtualized small cells 1402 and 1414. Only two examples of virtualized small cells are included, but many instances of virtualized small cells will be instantiated, depending on the traffic needs.

Each virtualized small cell includes a radio resource control (1404, 1416). Other virtual machines may provide additional functions, such as MME, SGW, PGW, HSS, AC, GGSN, and SGSN. These functions support LTE and some other types of communications. Some virtual cells may provide other types of access, such as WiFi. Other virtual machines may be included to support those communications protocols.

These virtual small cells communicate with remote small cell radio units (1440, 1442, 1444 and 1446). An example remote small radio cell unit is shown in FIG. 14B. Remote small radio cell 1446 includes an RF transport 1458, a physical layer transport 1456, medium access control (MAC) 1454, a radio link control (RLC) 1452, a packet data convergence protocol (PDCP) controller 1450, an X1-C unit 1447 and an S1-U unit 1448, which manage communication with a corresponding virtualized small cell in virtual environment 1410. Each of these functions are managed by RRC instances 1404 or 1416. An optional local gateway LGW 1460 may also be included. The configuration of FIGS. 14A and 14B can be used as a substructure in a carrier wireless system or as a local enterprise based system, among other applications.

Figure 15:
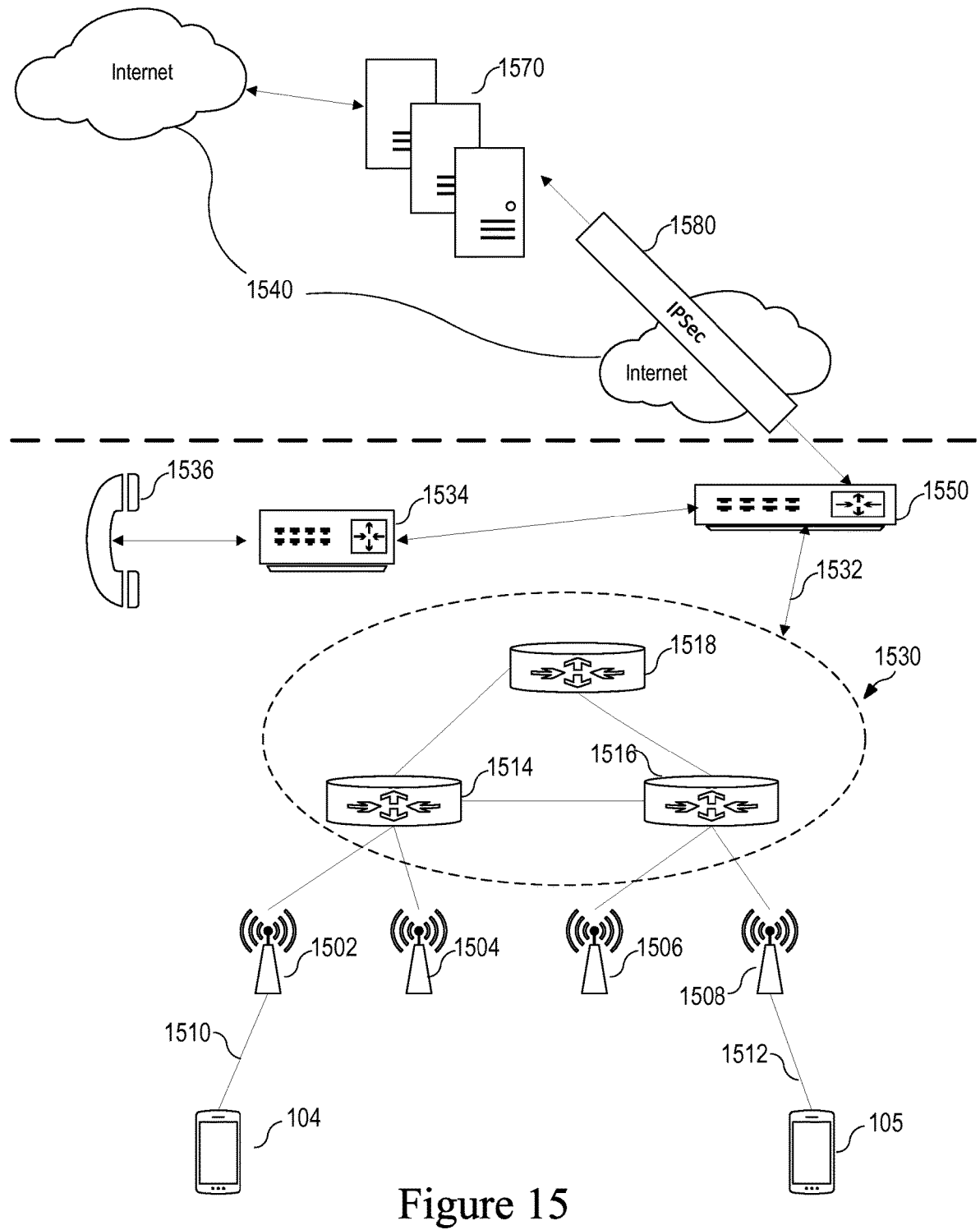
FIG. 15 illustrates an enterprise-type configuration, which is another embodiment.

FIG. 15 illustrates another embodiment useful in an enterprise system connected to a carrier network. Cell units 1502, 1504, 1506 and 1508 are small cells that can use a variety of wireless technologies. For example, the small cells could communicate with UE 104 using an LTE connection and with UE 105 using a WiFi connection. Cell units 1502, 1504, 1506 and 1508, like remote small cell unit 1446, are configured using the minimum hardware and software necessary to receive and packetize transmissions from the UEs and to receive packetized data from network 1530 and send it to the UEs in the appropriate format. All enterprise wireless traffic is routed by the routers in network 1530 (e.g., routers 1514, 1516 and 1518) to pico controller 1550 via link 1532. Pico controller integrates all of the virtualized units necessary to handle the enterprise wireless traffic. Pico controller 1550 may be a specifically configured device or a virtualized environment like virtualized environment 1410. The units of pico controller 1550 may include a radio network controller (RNC), a WiFi AC controller, an LTE RRC, and MME and an SGW. Using these facilities, pico controller 1550 can route call traffic to the enterprise PBX 1534, which can connect the call to an internal hardwired telephone 1536. Alternatively, traffic (call or data) may be routed out of the enterprise to a carrier network 1570 using an IP Security link 1580 through the Internet 1540. The carrier may then route the traffic to an Internet 1540 location or may make any other type of connection available to the carrier.

Figure 16:
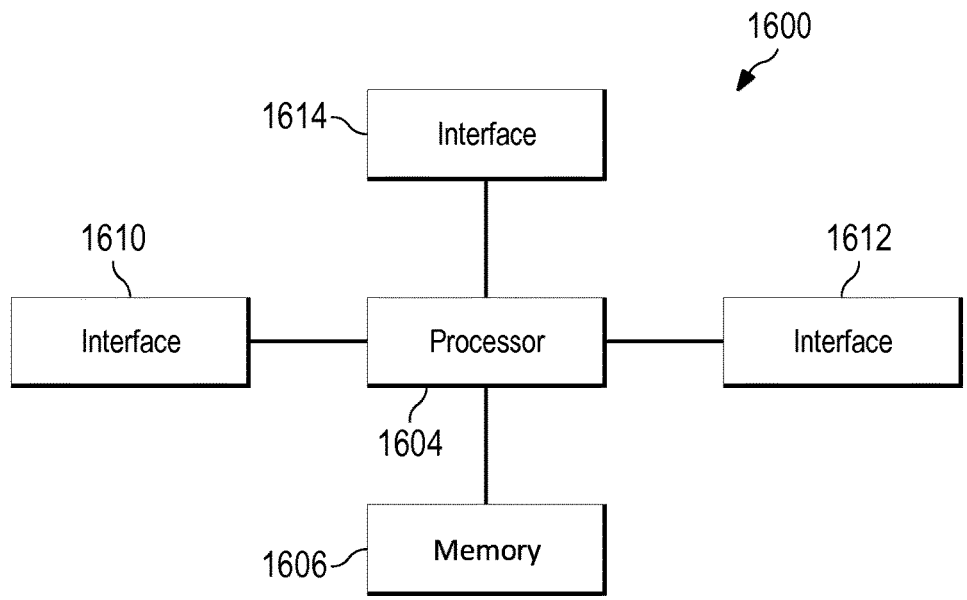
FIG. 16 illustrates a block diagram of an embodiment processing system 1400 for implementing embodiments described herein.

FIG. 16 illustrates a block diagram of an embodiment processing system 1600 for performing methods described herein, which may be installed in a host device. As shown, the processing system 1600 includes a processor 1604, a memory 1606, and interfaces 1610-1614, which may (or may not) be arranged as shown in FIG. 16. The processor 1604 may be any component or collection of components adapted to perform computations and/or other processing related tasks, and the memory 1606 may be any component or collection of components adapted to store programming and/or instructions for execution by the processor 1604. In an embodiment, the memory 1606 includes a non-transitory computer readable medium. The interfaces 1610, 1612, 1614 may be any component or collection of components that allow the processing system 1600 to communicate with other devices/components and/or a user. For example, one or more of the interfaces 1610, 1612, 1614 may be adapted to communicate data, control, or management messages from the processor 1604 to applications installed on the host device and/or a remote device. As another example, one or more of the interfaces 1610, 1612, 1614 may be adapted to allow a user or user device (e.g., personal computer (PC), etc.) to interact/communicate with the processing system 1600. The processing system 1600 may include additional components not depicted in FIG. 16, such as long term storage (e.g., non-volatile memory, etc.).

In some embodiments, the processing system 1600 is included in a network device that is accessing, or part otherwise of, a telecommunications network. In one example, the processing system 1600 is in a network-side device in a wireless or wireline telecommunications network, such as a base station, a relay station, a scheduler, a controller, a gateway, a router, an applications server, or any other device in the telecommunications network. In other embodiments, the processing system 1600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 17:
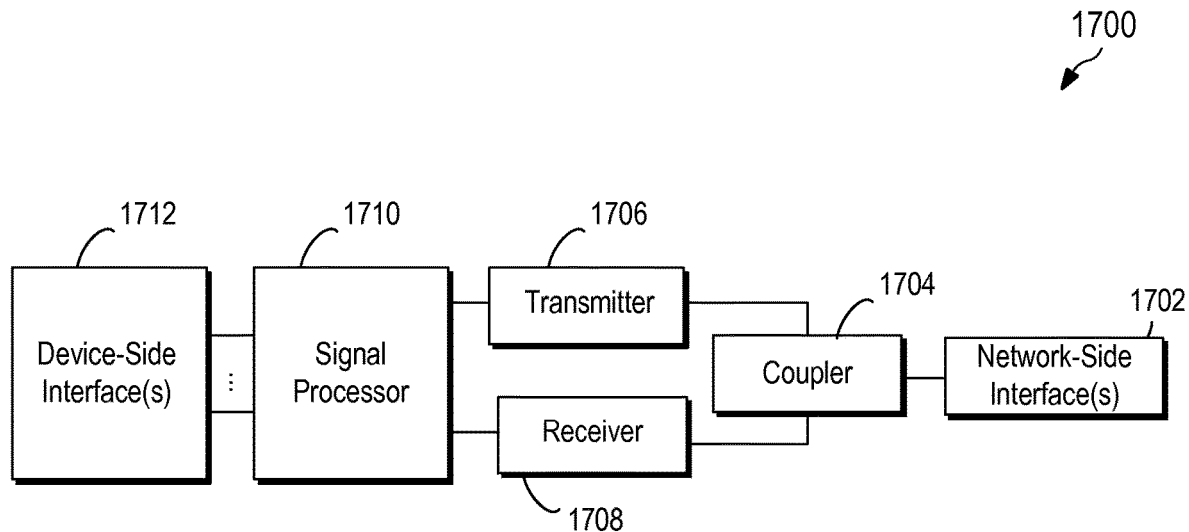
FIG. 17 illustrates a block diagram of a transceiver 1500 adapted to transmit and receive signaling over a telecommunications network.

In some embodiments, one or more of the interfaces 1610, 1612, 1614 connects the processing system 1600 to a transceiver adapted to transmit and receive signaling over the telecommunications network. FIG. 17 illustrates a block diagram of a transceiver 700 adapted to transmit and receive signaling over a telecommunications network. The transceiver 700 may be installed in a host device. As shown, the transceiver 1700 comprises a network-side interface 1702, a coupler 1704, a transmitter 1706, a receiver 1708, a signal processor 1710, and a device-side interface 1712. The network-side interface 1702 may include any component or collection of components adapted to transmit or receive signaling over a wireless or wireline telecommunications network. The coupler 1704 may include any component or collection of components adapted to facilitate bi-directional communication over the network-side interface 1702. The transmitter 1706 may include any component or collection of components (e.g., up-converter, power amplifier, etc.) adapted to convert a baseband signal into a modulated carrier signal suitable for transmission over the network-side interface 1702. The receiver 1708 may include any component or collection of components (e.g., down-converter, low noise amplifier, etc.) adapted to convert a carrier signal received over the network-side interface 1702 into a baseband signal. The signal processor 1710 may include any component or collection of components adapted to convert a baseband signal into a data signal suitable for communication over the device-side interface(s) 1712, or vice-versa. The device-side interface(s) 1712 may include any component or collection of components adapted to communicate data-signals between the signal processor 1710 and components within the host device (e.g., the processing system 600, local area network (LAN) ports, etc.).

The transceiver 1700 may transmit and receive signaling over any type of communications medium. In some embodiments, the transceiver 1700 transmits and receives signaling over a wireless medium. For example, the transceiver 1700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1702 comprises one or more antenna/radiating elements. For example, the network-side interface 1702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1700 transmits and receives signaling over a wireline medium, e.g., twisted-pair cable, coaxial cable, optical fiber, etc. Specific processing systems and/or transceivers may utilize all of the components shown, or only a subset of the components and levels of integration may vary from device to device.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A wireless communication system comprising:
   a software defined network (SDN)-enabled base station comprising:
      a first legacy base station; and
      a first SDN-enabled router configured to:
         establish a first communication tunnel between the first SDN-enabled router and the first legacy base station for sending and receiving data packets;
         receive a flow of data packets from the first legacy base station through the first communication tunnel established between the first SDN-enabled router and the first legacy base station, the flow of data packets comprising a first data packet and subsequent data packets; and
         transmit the first data packet to a computing platform comprising an SDN controller running at least one virtual device, with the SDN controller including computer instructions to configure, based on the first data packet received from the first SDN-enabled router, a routing function for routing the flow of data packets by the first SDN-enabled router from the first legacy base station to a second legacy base station, the routing function comprising a routing path;
   wherein the first SDN-enabled router is further configured to:
      determine a route for routing the flow of data packets received from the first legacy base station through the first communication tunnel to the second legacy base station through a second communication tunnel established between a second SDN-enable router and the second legacy base station, and a routing path comprising one or more routers between the first SDN-enabled router and the second SDN-enabled router, based on the routing function configured by the SDN controller, with the route bypassing a gateway;
      receive the first data packet from the SDN controller; and
      transmit the flow of data packets from the first legacy base station to the second legacy base station through the first communication tunnel, the second communication tunnel and the routing path according to the determined route.

2. The wireless communication system of claim 1, wherein the first legacy base station is a Long Term Evolution (LTE) base station or a WiFi base station.

3. The wireless communication system of claim 1, wherein the first SDN-enabled router serves as an SDN data packet router for the first legacy base station.

4. The wireless communication system of claim 1, wherein the at least one virtual device includes a mobility management entity (MME), a serving gateway (SGW), a packet data network gateway (PGW), a home subscriber service (HSS), an access controller (AC) or a gateway general packet radio service (GPRS) support node (GGSN) serving GPRS support node (SGSN).

5. The wireless communication system of claim 1, wherein the first communication tunnel is established using a general packet radio service (GPRS) tunneling protocol (GTP) or a generic routing encapsulation (GRE) tunnel.

6. The wireless communication system of claim 1, wherein the gateway comprises a serving gateway or a packet data network gateway.

7. A first software defined network (SDN)-enabled router proximal to a first legacy base station, the first SDN-enabled router comprising:
   a non-transitory memory storage comprising instructions; and
   one or more processors in communication with the memory storage, wherein the one or more processors execute the instructions to:
      establish a first communication tunnel between the first SDN-enabled router and the first legacy base station for sending and receiving data packets;
      receive, from the first legacy base station through the first communication tunnel established between the first SDN-enabled router and the first legacy base station, a flow of data packets to be transmitted to a second legacy base station through the first SDN-enabled router, the flow of data packets comprising a first data packet and subsequent data packets;

communicate with a computing platform comprising an SDN controller running at least one virtual device;

send the first data packet to the SDN controller for obtaining, from the SDN controller, a routing function for routing the flow of data packets by the first SDN-enabled router from the first legacy base station to the second legacy base station;

receive, in response to sending the first data packet to the SDN controller, the routing function from the SDN controller of the computing platform for routing the flow of data packets from the first legacy base station to the second legacy base station;

determine a route for routing the flow of data packets received from the first legacy base station through the first communication tunnel to the second legacy base station through a second communication tunnel established between a second SDN-enabled router and the second legacy base station, and a routing path comprising one or more routers between the first SDN-enabled router and the second SDN-enabled router, based on the routing function, with the route bypassing a gateway;

receive the first data packet from the SDN controller; and transmit the flow of data packets from the first legacy base station to the second legacy base station through the first communication tunnel and the second communication tunnel according to the determined route.

8. The first SDN-enabled router of claim 7, wherein the first SDN-enabled router is co-located with the first legacy base station.

9. The first SDN-enabled router of claim 7, wherein the first legacy base station is a Long Term Evolution (LTE) base station or a WiFi base station.

10. The first SDN-enabled router of claim 7, wherein the first SDN-enabled router serves as an SDN data packet router for the first legacy base station.

11. The first SDN-enabled router of claim 7, wherein the at least one virtual device includes a mobility management entity (MME), a serving gateway (SGW), a packet data network gateway (PGW), a home subscriber service (HSS), an access controller (AC) or a gateway general packet radio service (GPRS) support node (GGSN) serving GPRS support node (SGSN).

12. The first SDN-enabled router of claim 7, wherein the first communication tunnel is established using a general packet radio service (GPRS) tunneling protocol (GTP) or a generic routing encapsulation (GRE) tunnel.

13. The first SDN-enabled router of claim 7, wherein the gateway comprises a serving gateway or a packet data network gateway.

14. A computing platform comprising:
a non-transitory memory storage comprising instructions; and
one or more processors in communication with the memory storage, wherein the one or more processors execute the instructions to:
run at least one virtual device;
communicate with a first software defined network (SDN)-enabled router of a SDN-enabled base station, the first SDN-enabled router configured to receive a flow of data packets from a first legacy base station of the SDN-enabled base station through a first communication tunnel between the first SDN-enabled router and the first legacy base station, the flow of data packets comprising a first data packet and subsequent data packets;

receive, from the first SDN-enabled router, the first data packet;

configure, based on the first data packet, a routing function for the first SDN-enabled router of the SDN-enabled base station to route the flow of data packets from the first legacy base station to a second legacy base station, the routing function comprising a routing path, and the routing path enabling the flow of data packets to be transmitted by the first SDN-enabled router to the second legacy base station through a second communication tunnel established between the second legacy base station and a second SDN-enabled router and a route comprising one or more routers between the first SDN-enabled router and the second SDN-enabled router, without being transmitted to a gateway;

forward the routing path to the first SDN-enabled router; and transmit the first data packet to the first SDN-enabled router.

15. The computing platform of claim 14, wherein the computing platform comprises an SDN controller.

16. The computing platform of claim 14, wherein the first SDN-enabled router is co-located with the first legacy base station.

17. The computing platform of claim 14, wherein the first legacy base station is a Long Term Evolution (LTE) base station or a WiFi base station.

18. The computing platform of claim 14, wherein the first SDN-enabled router serves as an SDN data packet router for the first legacy base station.

19. The computing platform of claim 14, wherein the at least one virtual device includes a mobility management entity (MME), a serving gateway (SGW), a packet data network gateway (PGW), a home subscriber service (HSS), an access controller (AC) or a gateway general packet radio service (GPRS) support node (GGSN) serving GPRS support node (SGSN).

20. The computing platform of claim 14, wherein the first communication tunnel is established using a general packet radio service (GPRS) tunneling protocol (GTP) or a generic routing encapsulation (GRE) tunnel.

21. The computing platform of claim 14, wherein the first SDN-enabled router is an SDN-enabled switch.

22. A method performed by a first software defined network (SDN)-enabled router, comprising:
establishing, by the first SDN-enabled router, a first communication tunnel between the first SDN-enabled router and a first legacy base station for sending and receiving data packets;

receiving, by the first SDN-enabled router from the first legacy base station through the first communication tunnel established between the first SDN-enabled router and the first legacy base station, a flow of data packets to be transmitted to a second legacy base station through the first SDN-enabled router, the flow of data packets comprising a first data packet and subsequent data packets;

sending, by the first SDN-enabled router to a computing platform comprising an SDN controller running at least one virtual device, the first data packet for obtaining, from the SDN controller, a routing function for routing the flow of data packets by the first SDN-enabled router from the first legacy base station to the second legacy base station;

receiving, by the first SDN-enabled router from the computing platform comprising the SDN controller, the routing function for routing the flow of data packets from the first legacy base station to the second legacy base station;

receiving, by the first SDN-enabled router from the computing platform, the first data packet;

determining, by the first SDN-enabled router, a route for routing the flow of data packets received from the first legacy base station to the second legacy base station through the first communication tunnel, a second communication tunnel and a routing path comprising one or more routers between the first SDN-enabled router and a second SDN-enabled router, based on the routing function, with the route bypassing a gateway, wherein the second communication tunnel is established between the second SDN-enabled router and the second legacy base station; and transmitting, by the first SDN-enabled router, the flow of data packets from the first legacy base station to the second legacy base station through the first communication tunnel, the routing path and the second communication tunnel according to the determined route.

23. The method of claim 22, wherein the first legacy base station is an LTE or a WiFi base station.

24. The method of claim 22, further comprising the first SDN-enabled router serving as an SDN data packet router for the first legacy base station.

25. The method of claim 22, wherein the at least one virtual device includes a mobility management entity (MME), a serving gateway (SGW), a packet data network gateway (PGW), a home subscriber service (HSS), an access controller (AC) or a gateway general packet radio service (GPRS) support node (GGSN) serving GPRS support node (SGSN).

26. The method of claim 22, the first communication tunnel is established using a general packet radio service (GPRS) tunneling protocol (GTP) or a generic routing encapsulation (GRE) tunnel.

27. The method of claim 22, wherein the gateway comprises a serving gateway or a packet data network gateway.

* * * * *